(12) United States Patent  
Ema et al.

(10) Patent No.: US 6,731,317 B2
(45) Date of Patent: May 4, 2004

(54) PULSE MODULATION SIGNAL GENERATION CIRCUIT, AND SEMICONDUCTOR LASER MODULATION DEVICE, OPTICAL SCANNING DEVICE AND IMAGE FORMATION DEVICE USING THE SAME

(75) Inventors: Hidetoshi Ema, Kanagawa (JP); Masaaki Ishida, Kanagawa (JP); Yasuhiro Nihei, Kanagawa (JP)

(73) Assignee: Ricoh Company, Ltd., Tokyo (JP)

(*) Notice: Subject to any disclaimer, the term of this patent is extended or adjusted under 35 U.S.C. 154(b) by 149 days.

(21) Appl. No.: 10/095,913

(22) Filed: Mar. 13, 2002

(65) Prior Publication Data

US 2002/0130944 A1 Sep. 19, 2002

(30) Foreign Application Priority Data

Mar. 14, 2001 (JP) ........................... 2001-072874
Sep. 28, 2001 (JP) ........................... 2001-304020

(51) Int. Cl.$^7$ ................ B41J 2/385; G03G 13/04
(52) U.S. Cl. ................................ 347/135; 347/132
(58) Field of Search ........................ 347/135, 143, 347/144, 252, 253, 132, 248

(56) References Cited

U.S. PATENT DOCUMENTS

| 4,443,121 A | 4/1984 | Arai |
| 4,455,578 A | 6/1984 | Fearnside |
| 4,635,000 A | 1/1987 | Swanberg |

(List continued on next page.)

FOREIGN PATENT DOCUMENTS

| GB | 2 026 283 | 1/1980 |
| JP | 3-279976 | 12/1991 |
| JP | 04337960 A | * 11/1992 | .......... G03G/15/04 |
| JP | 5-75199 | 3/1993 |
| JP | 5-235446 | 9/1993 |
| JP | 9-116750 | 5/1997 |
| JP | 9-321376 | 12/1997 |
| JP | 2000-85181 | 3/2000 |
| JP | 2001-18445 | 1/2001 |
| JP | 2001-186348 | 7/2001 |
| JP | 2001-246778 | 9/2001 |

OTHER PUBLICATIONS

Pub. No.: U.S. 2002/0080428; Appl. No.: 09/955,181; filed: Sep. 19, 2001; Inventor: Suzuki et al.
Pub. No.: U.S. 2002/0101642; Appl. No.: 10/058,446; filed: Jan. 28, 2002; Inventor: Masuda.
Application No.: 10/053,272 filed on Jan. 17, 2002 Published on Aug. 8, 2002 with Publication No. US2002/0105707.
Application No.:09/791,407 filed on Feb. 22, 2001 Published on Dec. 27, 2001 with Publication No.: US2001/0055140.
U.S. patent application Ser. No. 09/678,611, Sakai et al., filed Oct. 4, 2000.
U.S. patent application Ser. No. 09/716,949, Atsuumi et al., filed Nov. 22, 2000.
U.S. patent application Ser. No. 09/788,415, Sakai et al., filed Feb. 21, 2001.

(List continued on next page.)

*Primary Examiner*—Susan S.Y. Lee
(74) *Attorney, Agent, or Firm*—Oblon, Spivak, McClelland, Maier & Neustadt, P.C.

(57) ABSTRACT

A clock generating part generates a high-frequency clock signal having a frequency higher than that of a pixel clock frequency; a serial modulation signal generating part generates a serial modulation signal having a serial pulse sequence based on the high-frequency clock signal, and, light emission is modulated according to the serial modulation signal, and, thus, each pixel of an image is formed according at the pixel clock frequency.

47 Claims, 32 Drawing Sheets

U.S. PATENT DOCUMENTS

| | | | |
|---|---|---|---|
| 4,819,066 A | | 4/1989 | Miyagi |
| 4,926,263 A | | 5/1990 | Yokota |
| 4,951,152 A | | 8/1990 | Suzuki et al. |
| 4,962,981 A | * | 10/1990 | Murakami et al. |
| 5,036,519 A | | 7/1991 | Ema et al. |
| 5,050,177 A | | 9/1991 | Ema |
| 5,138,623 A | | 8/1992 | Ema et al. |
| 5,223,857 A | * | 6/1993 | Loce et al. |
| 5,237,579 A | | 8/1993 | Ema et al. |
| 5,258,780 A | | 11/1993 | Ema et al. |
| 5,325,160 A | | 6/1994 | Imakawa et al. |
| 5,495,341 A | | 2/1996 | Kawana et al. |
| 5,739,842 A | * | 4/1998 | Murata ................. 347/247 |
| 5,784,091 A | | 7/1998 | Ema et al. |
| 5,946,334 A | | 8/1999 | Ema et al. |
| 6,081,386 A | | 6/2000 | Hayashi et al. |
| 6,118,798 A | | 9/2000 | Ema et al. |
| 6,154,246 A | * | 11/2000 | Ogasawara et al. ......... 347/248 |
| 6,185,026 B1 | | 2/2001 | Hayashi et al. |
| 6,198,562 B1 | | 3/2001 | Hayashi et al. |
| 6,229,638 B1 | | 5/2001 | Sakai et al. |
| 6,233,081 B1 | | 5/2001 | Suzuki et al. |
| 6,317,246 B1 | | 11/2001 | Hayashi et al. |
| 6,359,717 B2 | | 3/2002 | Suzuki et al. |
| 6,369,927 B2 | | 4/2002 | Hayashi |
| 6,376,837 B1 | | 4/2002 | Itabashi et al. |
| 6,384,949 B1 | | 5/2002 | Suzuki |
| 6,388,792 B1 | | 5/2002 | Atsuumi et al. |
| 6,400,391 B1 | | 6/2002 | Suhara et al. |
| 6,417,509 B1 | | 7/2002 | Atsuumi et al. |
| 6,445,482 B1 | | 9/2002 | Hayashi |
| 6,448,998 B1 | | 9/2002 | Suzuki et al. |
| 6,462,853 B2 | | 10/2002 | Hayashi |
| 6,509,995 B1 | | 1/2003 | Suzuki et al. |

OTHER PUBLICATIONS

U.S. patent application Ser. No. 09/816,378, Suzuki et al., filed Mar. 26, 2001.

U.S. patent application Ser. No. 10/047,698, Suzuki, filed Jan. 18, 2002.

U.S. patent application Ser. No. 10/059,371, Ono, filed Jan. 31, 2002.

U.S. patent application Ser. No. 10/047,092, Atsuumi, filed Jan. 17, 2002.

U.S. patent application Ser. No. 10/161,659, Suzuki et al., filed Jun. 5, 2002.

U.S. patent application Ser. No. 10/161,756, Atsuumi et al., filed Jun. 5, 2002.

U.S. patent application Ser. No. 10/183,748, Nihei et al., filed Jun. 28, 2002.

U.S. patent application Ser. No. 10/109,696, filed Apr. 1, 2002, unknown.

U.S. patent application Ser. No. 09/689,790, filed Oct. 13, 2000, allowed.

U.S. patent application Ser. No. 09/797,574, filed Mar. 5, 2001, pending.

U.S. patent application Ser. No. 09/873,256, filed Jun. 5, 2001, pending.

U.S. patent application Ser. No. 10/214,559, filed Aug. 9, 2002, pending.

U.S. patent application Ser. No. 09/765,608, filed Jan. 22, 2001, pending.

U.S. patent application Ser. No. 09/860,520, filed May 21, 2001, pending.

U.S. patent application Ser. No. 09/910,797, filed Jul. 24, 2001, allowed.

U.S. patent application Ser. No. 09/946,665, filed Sep. 6, 2001, pending.

U.S. patent application Ser. No. 09/968,546, filed Oct. 2, 2001, allowed.

U.S. patent application Ser. No. 09/982,831, filed Oct. 22, 2001, pending.

U.S. patent application Ser. No. 10/028,698, filed Dec. 28, 2001, pending.

U.S. patent application Ser. No. 10/085,707, filed Mar. 1, 2002, pending.

U.S. patent application Ser. No. 10/101,937, filed Mar. 21, 2002, allowed.

U.S. patent application Ser. No. 10/143,013, filed May 13, 2002, pending.

U.S. patent application Ser. No. 10/259,769, filed Sep. 30, 2002, pending.

* cited by examiner

IMAGE DATA    DOT IMAGE

IMAGE DATA    DOT IMAGE

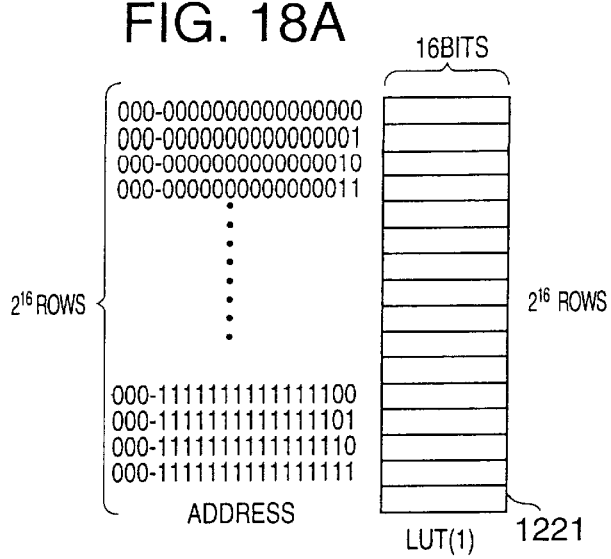
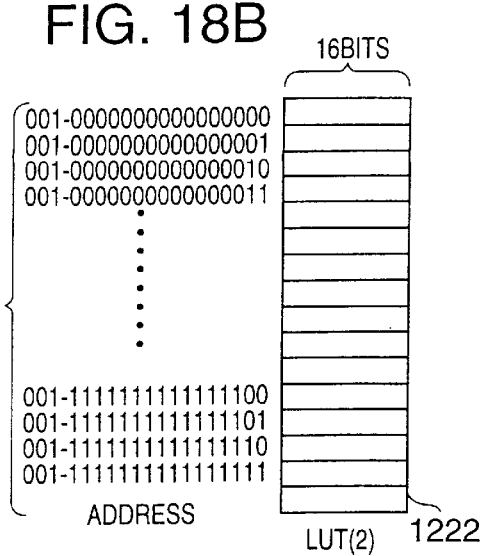
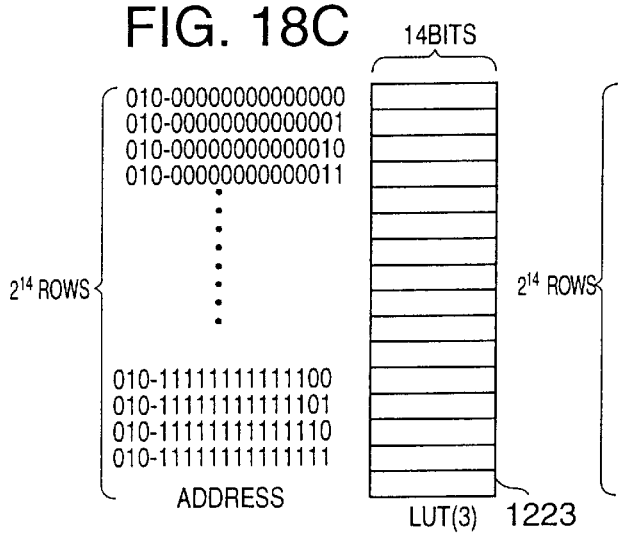
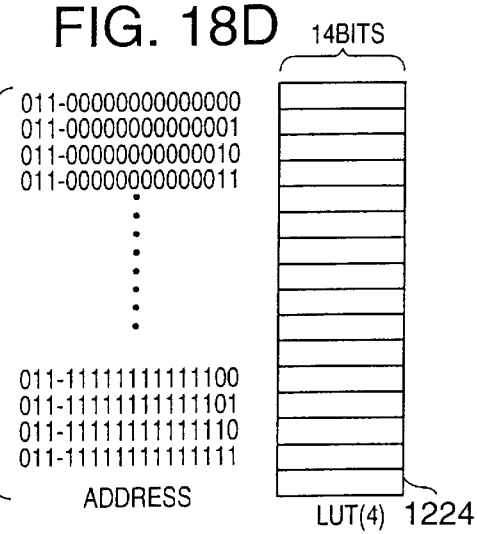
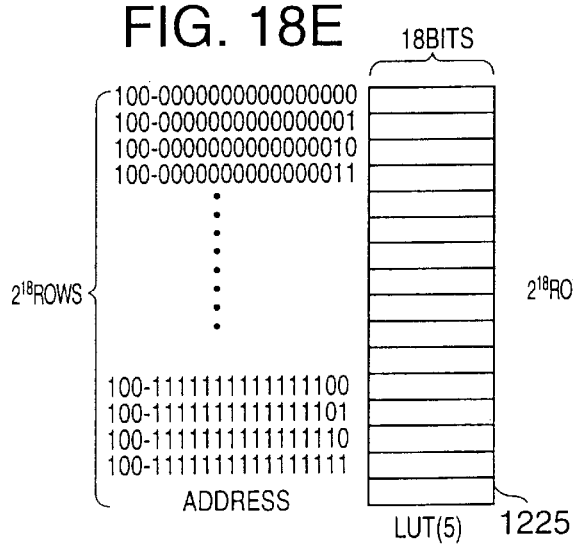
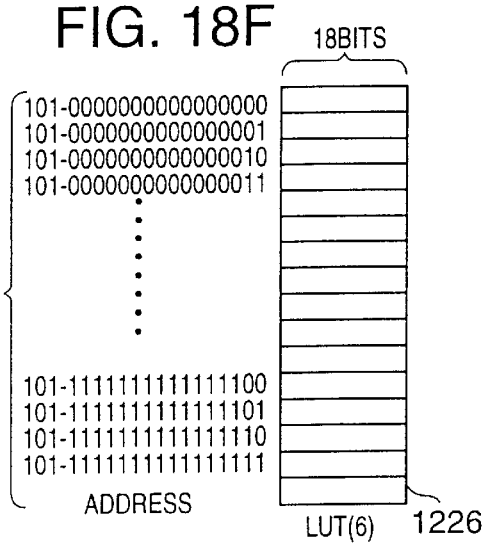

16 OUTPUT PULSES

14 OUTPUT PULSES

16 OUTPUT PULSES

18 OUTPUT PULSES

16 OUTPUT PULSES

14 OUTPUT PULSES

18 OUTPUT PULSES

PULSE MODULATION SIGNAL GENERATION CIRCUIT, AND SEMICONDUCTOR LASER MODULATION DEVICE, OPTICAL SCANNING DEVICE AND IMAGE FORMATION DEVICE USING THE SAME

BACKGROUND OF THE INVENTION

1. Field of the Invention

The present invention relates to a light-emission modulation scheme, and, in particular, to an optimum pulse modulation signal generation circuit for modulating an optical output of a light source, a semiconductor laser modulation device equipped with it, an optical scanning device, and an image formation device, applied to a laser printer, an LED printer, an optical disk device, a digital copier, an optical-communications device, etc., employing the light-emission modulation scheme.

2. Description of the Related Art

As a type of modulating an optical output of a light source, there are a power modulation type of modulating the amount of light itself, a pulse-width modulation type of modulating the emission time of the light, a power and pulse-width combined modulation type. Generally, the pulse-width modulation type is commonly used. There, a triangular wave or a saw-tooth wave corresponding to each pulse generating period is generated, it is compared with an analog video signal using a comparator, a pulse width modulation signal is generated. Alternatively, delay pulses may be generated by using a high frequency clock signal and performing frequency dividing on the clock signal in a digital manner, and a pulse width modulation signal is generated through performance of logical sum or logical product thereon.

In recent years, in a laser printer, a digital copier, and another image formation device, a further improvement in operation speed is desired. However, when the above-mentioned triangular wave or saw-tooth wave is used, it is difficult to improve operation speed while securing linearity/reproducibility of the triangular wave or saw-tooth wave.

In case applying a scheme of performing frequency dividing in a digital manner a high frequency clock signal, the highest operation frequency depends on the device applied, and has a problem in that it is difficult to improve the operation speed while securing the gray scale characteristics of an output image. For example, in order to achieve 256-step gray-scale modulation by using a pixel clock signal of 50 MHz, it is difficult to provide a triangle wave or saw-tooth wave having a satisfactorily linearity and swing in a period of 20 ns. In case of digital frequency dividing scheme, it is difficult to provide a clock signal having a frequency of 50 MHz×256=12.8 GHz.

SUMMARY OF THE INVENTION

An object of the present invention is to provide a pulse modulation signal generation circuit which enables generation of a pulse modulation signal of a desired pattern arbitrarily with a simple configuration, and, thereby, even in case the operation frequency is very high, fine gray-scale characteristics can be achieved on an output image.

A pulse modulation signal generating circuit according to the present invention includes:
a clock generating part (11) generating a high-frequency clock signal having a frequency higher than that of a pixel clock frequency; and
a serial modulation signal generating part (13) generating a serial modulation signal having a serial pulse sequence based on the high-frequency clock signal,
wherein light emission is modulated according to the serial modulation signal, and, thus, each pixel of an image is formed according at the pixel clock frequency.

The pulse modulation signal generating circuit may further include a modulation data generating part (12) generating modulation data comprising a predetermined bit pattern according to given image data, the serial modulation signal generating part generating the serial modulation signal based on the modulation data.

The above-mentioned modulation data generating part may include a look-up table (122) for converting given image data into the corresponding modulation data.

According to the present invention, no complex configuration is needed for generating a predetermined pulse pattern, and the pulse modulation signal generation circuit can achieve a fine gray scale on an image with a simple configuration while a speed of operation is high. Moreover, it becomes possible to form an image with an arbitrarily time interval without using a periodic pixel clock which determines 1 dot or 1 pixel by applying the above-mentioned configuration to an image formation device.

Moreover, a semiconductor laser modulation device, an optical scanning device, and an image formation device of small size, low cost, and power saving can be provided by making the pulse modulation part and high frequency clock generation part into an integrated circuit in one chip.

An exposure method according to the present invention includes the steps of:
a) driving a light-emitting unit according to modulation signal; and
b) exposing a photoconductor while scanning it with a laser beam emitted by the light-emitting unit,
wherein:
the modulation signal comprises a pulse sequence; and
an exposure energy distribution in which the photoconductor is exposed is determined as a result of control of both a pulse width and a pulse pattern of the pulse sequence.

There, as a result of control of the exposure energy distribution, a density of a latent image formed on the photoconductor may be controlled on each position/pixel.

The exposure energy distribution may thus be controlled not only by control of total light-emission time interval during each unit time or each pixel but also by control of light-emission timing there.

Thus, by controlling the exposure energy distribution, it becomes possible to make steep the rising/decaying part of the exposure energy distribution as shown in FIG. 46, and to easily control the linearly in width of the exposure energy distribution (namely, the diameter of a relevant dot in the image thus formed) by changing the pulse width and the pulse pattern in the optical modulation signal.

Furthermore, as shown in FIGS. 47 and 48, it becomes possible to control image density/gray scale (i.e., the diameter of a relevant dot for every pixel) still more finely than the frequency of the clock pulse of the image clock (pixel clock) signal.

Specifically, in the example of FIGS. 47 and 48, although the frequency of the image clock signal has eight periods per pixel, it becomes possible achieve total 19 steps of the exposure energy distribution thus beyond twice thereof, and, achieve densities/gray scale (dot diameters) in the same number as a result adopting a pulse pattern like this.

BRIEF DESCRIPTION OF THE DRAWINGS

Other objects and further features of the present invention will become more apparent from the following detailed description when read in conjunction with the following accompanying drawings:

FIGS. 17A, 17B, 18A, 18B, 18C, 18D, 18E and 18F illustrate specific examples of applying a plurality of look-up tables;

DESCRIPTION OF THE PREFERRED EMBODIMENTS

Figure 1:
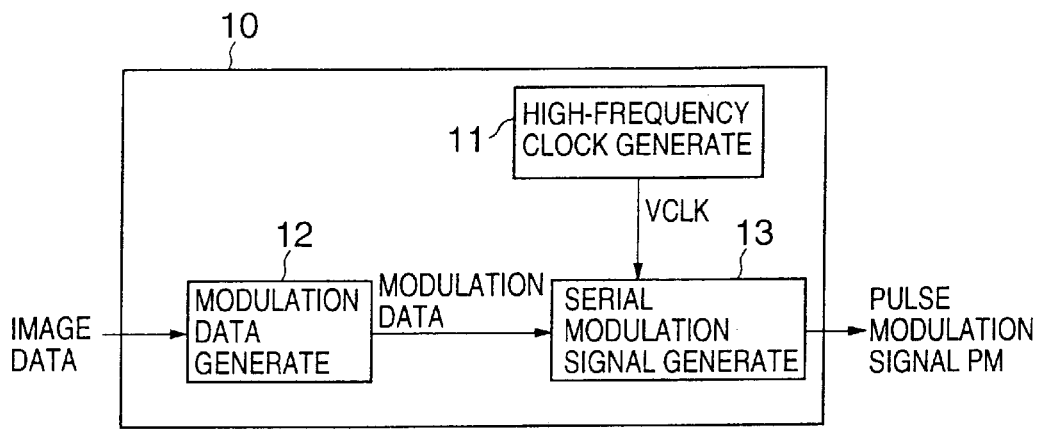
FIG. 1 shows a conceptual diagram of one embodiment of a pulse modulation signal generation circuit according to the present invention.

A basic concept of a pulse modulation signal generation circuit according to the present invention is illustrated by FIG. 1. In FIG. 1, the pulse modulation signal generation circuit 10 includes a high frequency clock generation part 11, a modulation data generation part 12, and a serial modulation signal generation part 13.

The high frequency clock generation part 11 generates a high-frequency clock signal VCLK having a period much shorter than a basic period corresponding each dot of image in general. The modulation data generation part 12 generates modulation data which expresses a desired bit pattern (pulse pattern) based on image data given from the outside, such as by an image-processing unit which is not shown.

The serial modulation signal generation part 13 inputs the modulation data output from the modulation data generation part 12, converts it into a serial pulse pattern sequence (pulse sequence) based on the high frequency clock signal VCLK, and outputs it as a pulse modulation signal PM. In addition, in case the modulation data from the outside is directly input into the serial modulation signal generation part 13, for example, the modulation data generation part 12 may be omitted accordingly.

A feature of this pulse modulation signal generation circuit 10 is to input modulation data into the serial modulation signal generation part 13, and output serially the pulse sequence corresponding to the bit pattern of modulation data based on the high frequency clock signal of a very high frequency much higher than the pixel clock signal, and generate the pulse modulation signal PM. As the serial modulation signal generation part 13, as will be described later, shift-registers may be used. Thus, in comparison to the related arts, it is possible to simplify the configuration, and, thus, to provide a high-speed, operation-variable pulse modulation signal generation circuit with a simple configuration.

Figure 2:
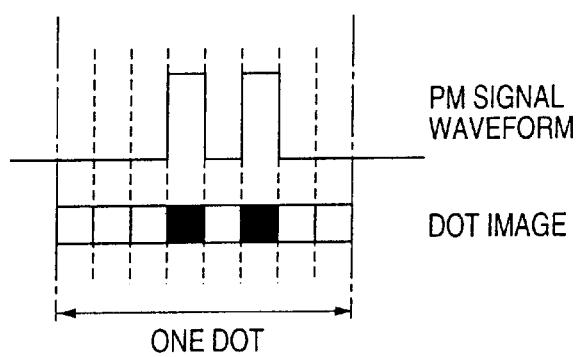
FIG. 2 shows a dot image in pulse modulation according to the present invention with reference to the configuration shown in FIG. 1.

A conceptual view of a pulse output image by the present invention will now be described with reference to FIG. 2. Here, an image for outputting a pulse sequence corresponding to 1 dot will be discussed for simplification of description. Since it is possible to output a pulse sequence one by one serially in case 1 dot is formed by eight pulses as shown in FIG. 2 for example, it is possible to output a desired pulse on a desired position of the dot by setting each of the eight pulse as ON (for example, black) or OFF (for example, white). Of course, it is not necessary to say that the present invention is not limited to such a 1-dot width manner, as mentioned above.

Figure 3:
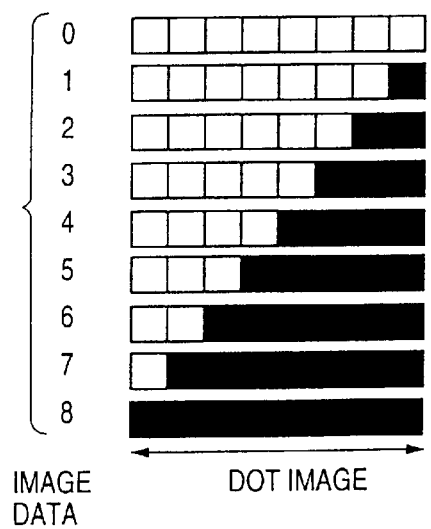
FIGS. 3, 4 and 5 illustrate dot images on pulse width modulation signals according to the related art.
Figure 4:
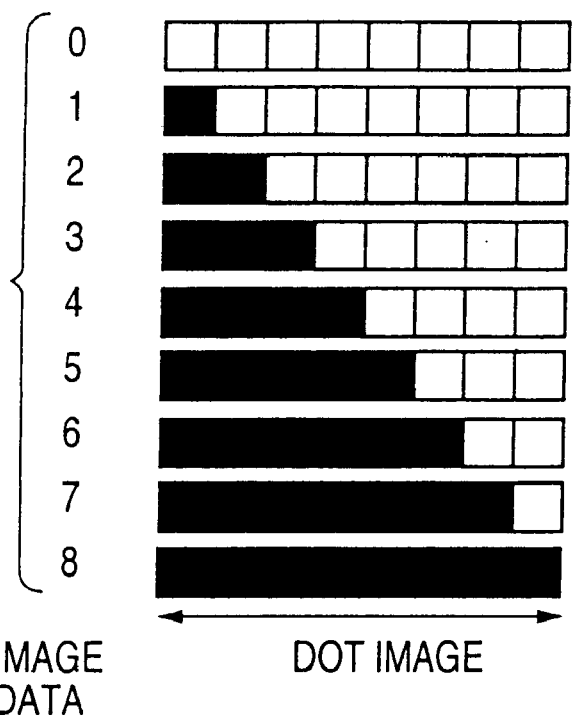
Figure 5:
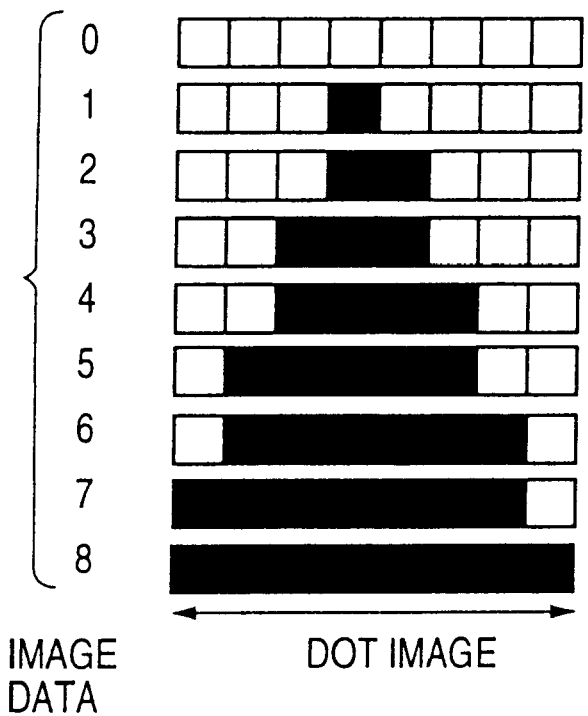
Figure 6:
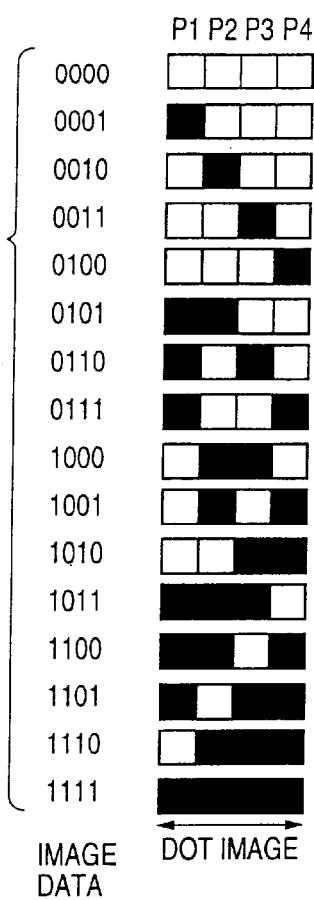
FIG. 6 illustrate dot images on pulse width modulation signals according to the present invention with reference to the configuration shown in FIG. 1.

FIGS. 3 through 5 show examples of pulses generated using pulse width modulation circuits in the related art, respectively, in case 1 dot is formed by eight pulses. FIG. 3 illustrates an example of forming pulses from the right, FIG. 4 illustrates an example of forming pulses from the left, and FIG. 5 illustrates an example of forming pulses from the inside. Thus, according to the related art, outputting desired pulses on desired positions of the dot, as shown in FIG. 6, cannot be performed. Even it can be performed, a complex configuration is needed therefor in the related art.

An example of a pulse output image according to the present invention is illustrated by FIG. 6. Here, for the sake of simplification, the example of a pulse output which includes four pulses on 1 dot, i.e., P1 through P4, as shown in the figure. As shown in FIG. 6, since output of pulses on arbitrary positions of 1 dot is possible, the output of pulse sequence in $2^4$=16 different types of patterns is possible in the case of four pulses. Similarly, in a case of five pulses, it is $2^5$=32 different types, and, in a case of six pulses, $2^6$=64 different types are available. Such a pulse sequence of an arbitrary pattern is easily generable by using a look-up table (LUT), for example.

Figure 7:
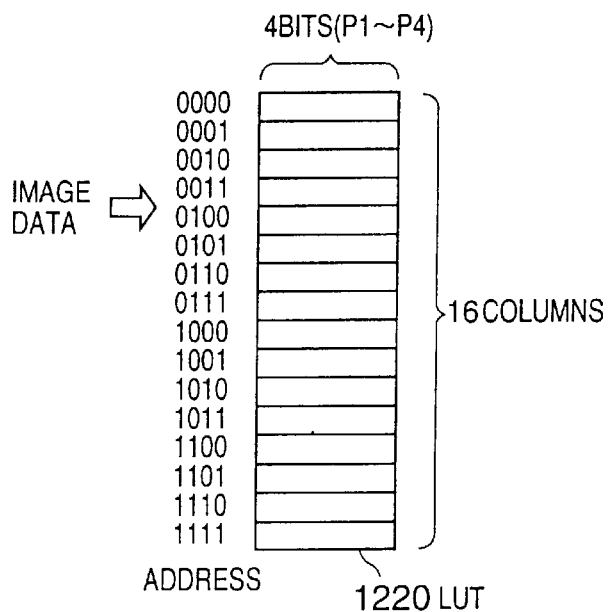
FIG. 7 illustrates a look-up table (LUT) which may be used in the modulations data generation part shown in FIG. 1.

One case of operation at a time of using a LUT for the modulation data generation part 12 of FIG. 1 is illustrated in FIG. 7. FIG. 7 shows an example of configuration in case of storing 16 types of bit patterns of 4 bits, P1–P4, i.e., four pulses, shown in FIG. 6, into a look-up table (LUT) 1220. In FIG. 7, a LUT 1220 includes 4 bits along horizontal direction, while includes 16 columns in vertical direction, and, thus, includes total 64 bits. Further, 16 addresses of 0000 through 1111 are given. Therefore, it is possible by inputting image data as address data to output a bit sequence (pulse sequence) P1 through P4 for a desired pattern as modulation data.

Moreover, as can be seen from FIG. 6, the output pattern of image data 1111 is one inverted from that of image data 0000. Similarly, the output patterns are inverted between 0001 and 1110, for example. By utilizing this character, the LUT 1220 needs not 16 columns but actually needs only 8 columns when an input data bit is inverted for a case. Thus, by using a data inversion signal, a memory space can be halved, and, thereby, miniaturization and cost reduction can be made.

This LUT may be made by a ROM, a DRAM, an SRAM, or any memory. In case of employing a DRAM, it is possible to miniaturize a configuration of the present invention in case the configuration is achieved by an ASIC, for example. In case of employing an SRAM, it is possible to provide a configuration improving operation speed, for example.

Figure 8:
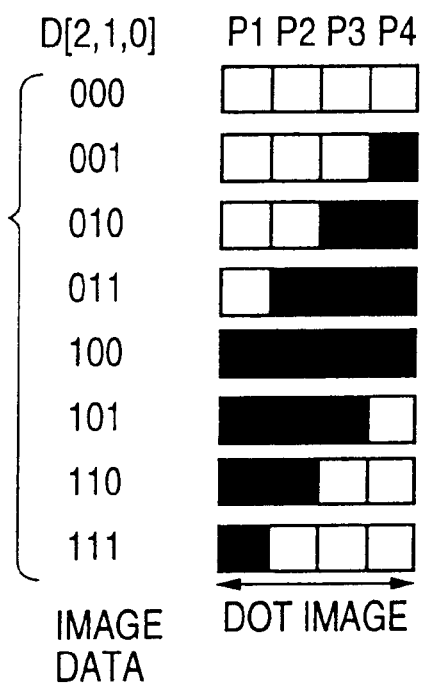
FIG. 8 illustrates another example of dot images on the pulse width modulation signals according to the present invention with reference to the configuration shown in FIG. 1.
Figure 9:
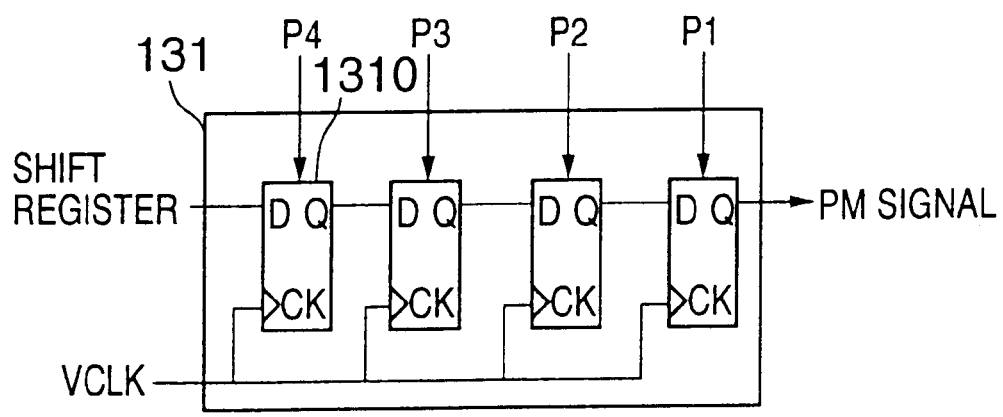
FIGS. 9, 10 and 11 illustrate specific examples of a shift register which may be used in the serial modulation signal generation part shown in FIG. 1.

It is not necessary to employ such a LUT as the modulation data generation part 12 of FIG. 1, but a decoder of a logic gate array may be used therefor instead. A conceptual diagram in the case of forming the modulation data generation part 12 of FIG. 1 by a decoder is illustrated by FIG. 8. In FIG. 8, an image output in eight types of pulse sequences of 4 bits, i.e., P1 through P4, i.e., four pulses, is expressed on 3-bit image data. There, when it is assumed that image data is given by D2 (bit data on MSB), D1 (bit data on second bit) and D0 (bit data on LSB), each output bit can be obtained through the following logic:

P1=D2;

P2=D2B·D1·D0+D2·D1B+D2·D1·D0B;

P3=D2B·D1+D2·D1B;

P4=D2B·D1B·D0+D2B·D1·D2·D1B·D0B where D0B, D1B, and D2B express inversion of D0, D1, and D2, respectively. This logic can be achieved by a combination of logical product and logical sum gates, such as AND and OR. Thus, it is possible to achieve the configuration not using the above-mentioned LUT The serial modulation signal generation part 13 of FIG. 1 inputs the modulation data output from the modulation data generation part 12 which includes the above-mentioned LUT, decoders or the like, and changes it into a serial pulse sequence. FIG. 9 illustrates an example in which the serial modulation signal generation part 13 is formed by a shift register. In a case of FIG. 9, it includes four flip flops (FF) or latches 1310. The shift register 131 inputs (loads) the modulation data P1 through P4 in parallel, and converts it into a pulse sequence in series by using a high frequency clock signal. Thus, it outputs the pulse modulation signal PM.

Figure 10:
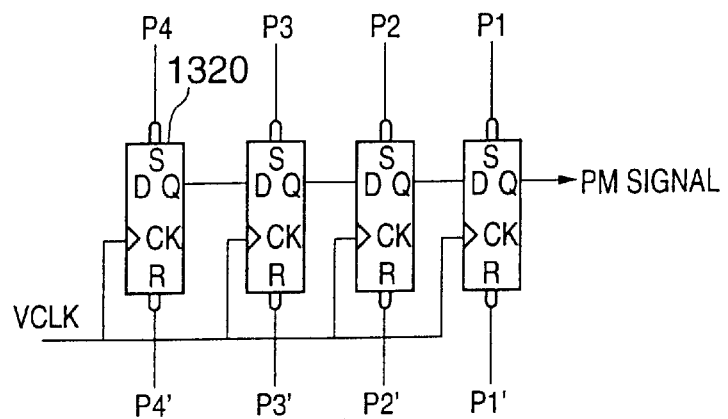
Figure 11:
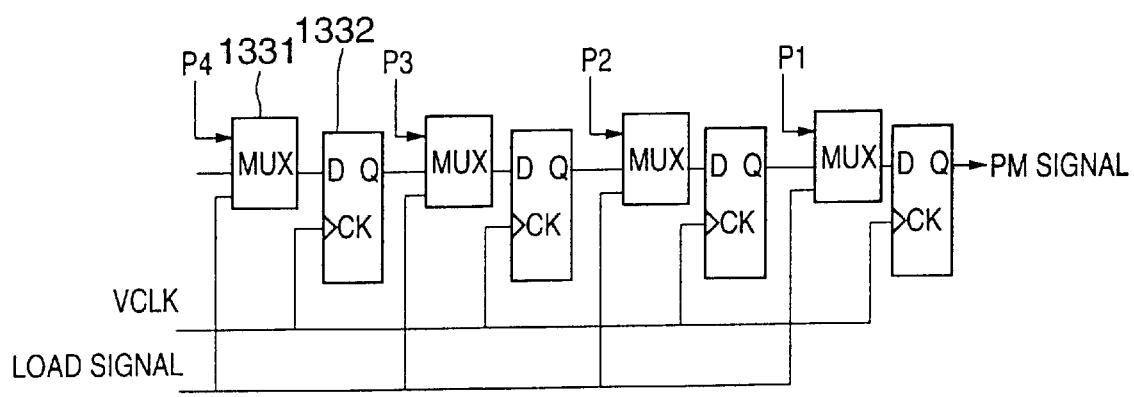

A specific example of configuration of the shift register used as the serial modulation signal generation part 13 is shown in FIG. 10 or FIG. 11. In FIG. 10, in use of a set/reset-type FF 1320, and data loading is performed by setting up a set or reset state thereof. FIG. 11 illustrates an example employing FF 1332 and multiplexer (MUX) 1331. In this case, according to a LOAD signal, it is determined whether data is shifted from a preceding FF or given data is loaded in each FF.

Figure 12:
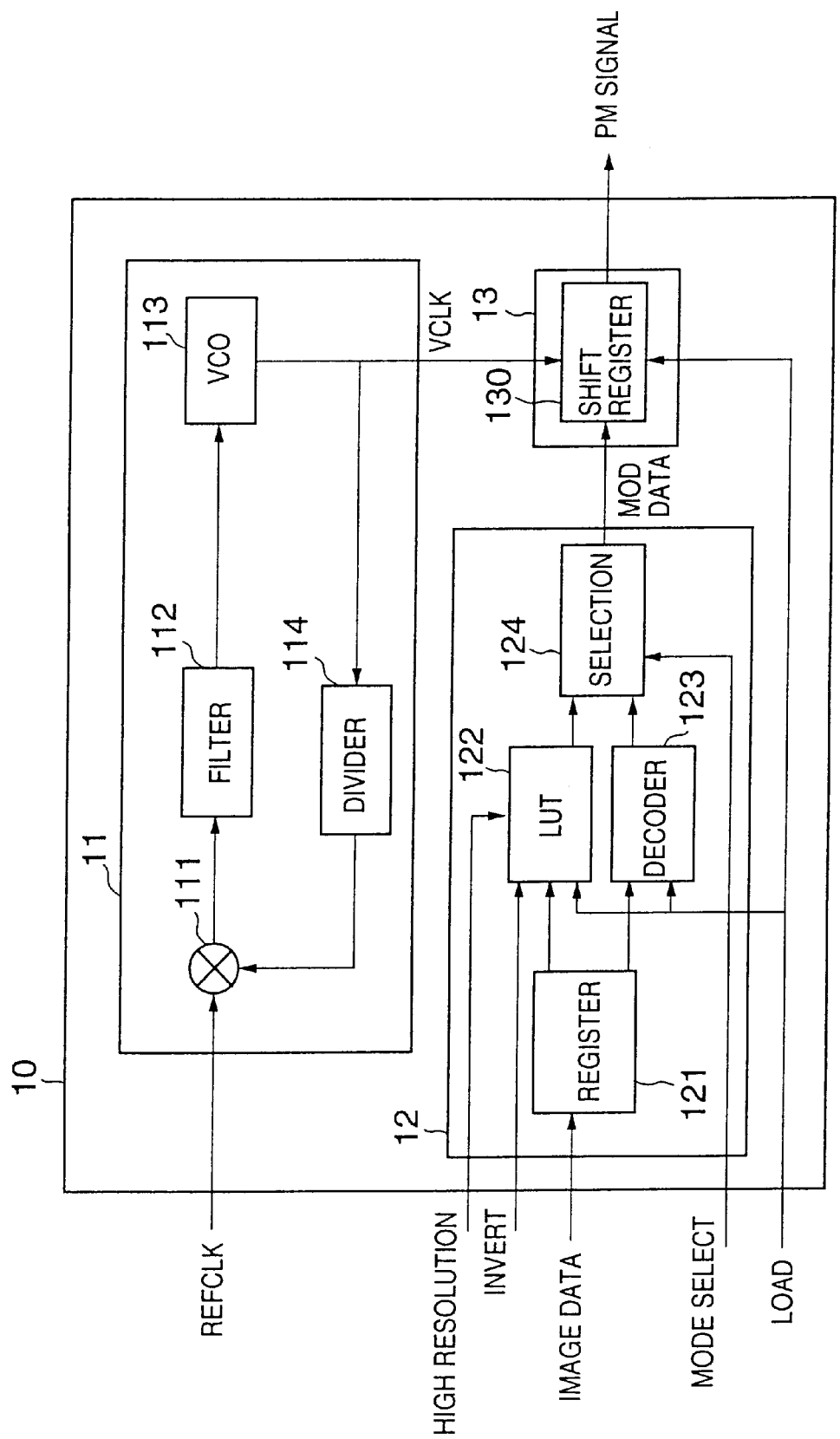
FIG. 12 shows block diagram of a specific example of pulse modulation signal generation circuit according to the present invention.

An example of overall configuration of the pulse modulation signal generation circuit 10 of FIG. 1 is shown in FIG. 12. By making this configuration as an ASIC (Application Specific IC) of one chip, energy saving, miniaturization, and cost reduction of the pulse width generation circuit can be achieved.

In FIG. 12, the high frequency clock generation part 11 includes a phase comparator 111, a loop filter 112, a voltage control oscillator (VCO) 113, and a frequency divider 114. This is so-called PLL circuit and thereby, it is possible to generate a very high frequency clock signal VCLK as a result of phase adjustment being made with a reference clock signal (for example, pixel clock signal) REFCLK, and also, frequency multiplication by N being made on this clock signal REFCLK. For example, the duty ratio of this VCLK is approximately 50%. However, as long as the high frequency clock generation part 10 can generate such a very high frequency clock signal, it should not include such a PLL circuit. For example, a digital frequency synthesizer, etc. may be employed therefor instead. Moreover, in the high frequency clock generation part 11, depending on necessity, a multi-phase clock signal may be generated, as will be described later.

The modulation data generation part 12 includes a register 121, a LUT 122, a decoder 123, and a selection circuit 124 and so forth, as shown in FIG. 12. Image data input from the outside is latched by the register 121, and, then, input into both the LUT 122 and decoder 123 at a timing of a load signal LOAD. In each of the LUT 122 and decoder 123, the image data is independently changed into modulation data of a predetermined bit pattern (pulse pattern). With a mode selection signal, the selection circuit 124 selects one of the modulation data output from LUT 122 and the modulation data output from the decoder 123, and outputs it to the serial modulation signal generation part 13.

Thus, by selecting one of the outputs of the LUT 122 and decoder 123 properly with the mode selection signal, flexibility is improved and generation of various modulation data is attained on given image data. For the sake of simplification of configuration, any one of the LUT 122 and decoder 123 may be omitted.

Moreover, by employing a configuration described above with reference to FIG. 7 of inputting a data inverting signal to the LUT 122, it is possible to miniaturize the LUT. Moreover, by providing a plurality of LUTs, and a configuration is made such that an output of a long pulse sequence is provided therefrom in case of input of a high-resolution mode signal. Thereby, as will be described later, it is possible to provide a configuration such as to be able to output a high-resolution image even by using small-sized memories. Similarly, it is also possible to provide a plurality of decoders.

The serial modulation signal generation part 13 includes a shift register 130, as shown in FIG. 12, having a configuration such as that shown in FIG. 9, 10 or 11. The shift register 130 loads in parallel the modulation data output from the modulation data generation part 12 according to the load signal LOAD, it performs shift operation one by one in synchronization with the high frequency clock signal VCLK given from the high frequency clock generation part 11, and thus, the pulse modulation signal of the serial pulse sequence corresponding to the bit pattern of modulation data is output therefrom. The shift register 130 may be formed in various configuration depending on the number of bits of modulation data (the number of pulses), etc.

Figure 13:
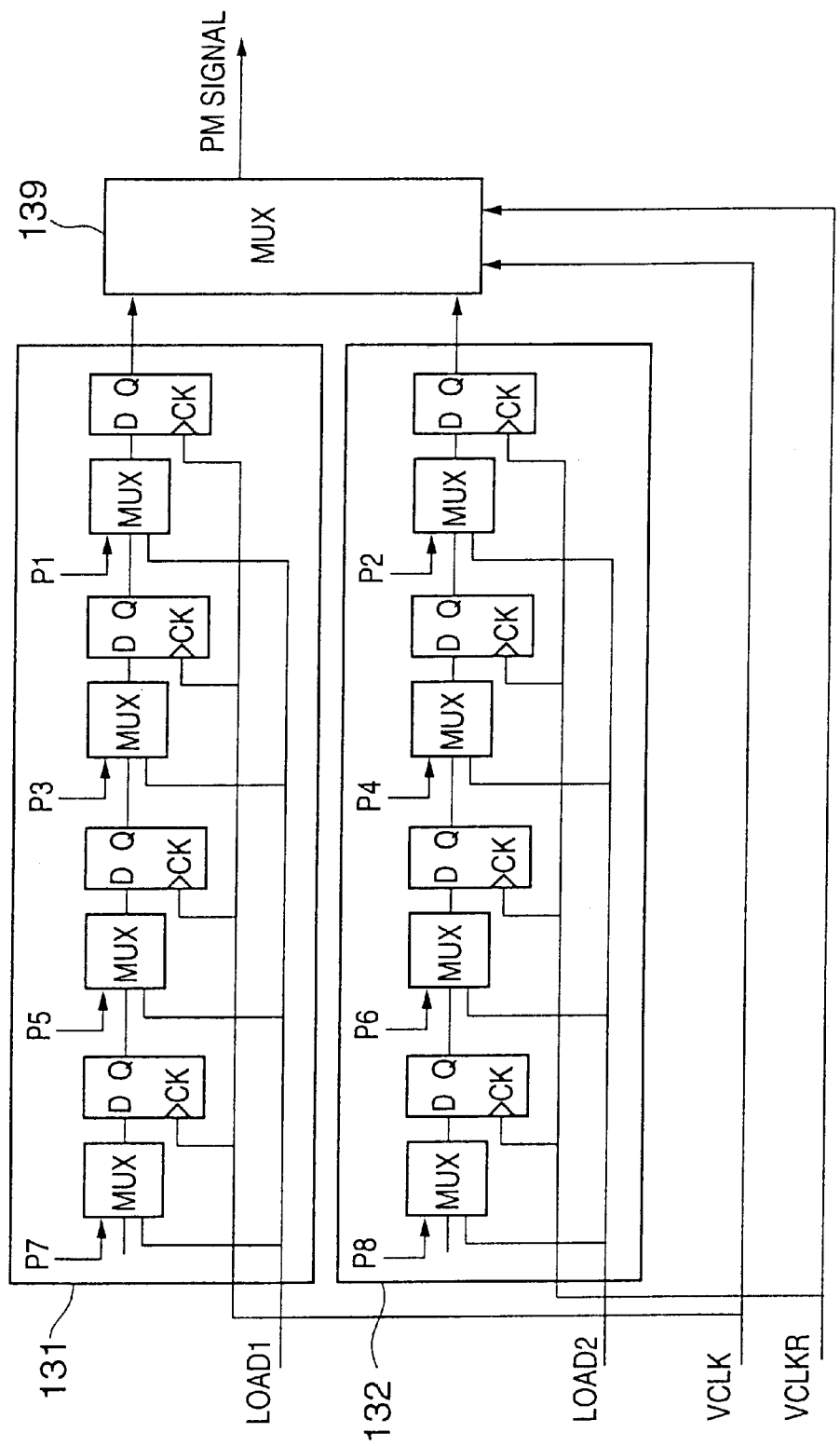
FIGS. 13, 14 and 15 illustrate specific examples of multi-row shift register.

An example of the configuration in case of configuring the serial modulation signal generation part 13 from two rows (sequences) of shift registers is shown in FIG. 13. In FIG. 13, the high frequency clock signal VCLK and the load signal LOAD1 are input into a shift register 131 on a top row, the inverted clock signal VCLKB of VCLK and the load signal LOAD2 are input into a shift register 132 on a bottom row, respectively, and a pulse sequence is serially output through a multiplexer (MUX) 139 according to a load signal which synchronized with the high frequency clock signal and the high frequency clock signal itself, respectively.

The modulation data includes 8-bit pulse sequences P1 through P8. Then, P1, P3, P5, and P7 are loaded in the shift register 131 at a timing of LOAD1, while P2, P4, P6, and P8 are loaded in the shift register 132 at a timing of LOAD2, and they are serially output in the order of P1, P2, P3, P4, P5, P6, P7, and P8 through the shift operation according to VCLK and VCLKB, and through switching operation by the MUX 139.

By employing a configuration such as shown in FIG. 13, it is possible to output the pulse sequence serially with the clock signal twice the speed of high frequency signal VCLK, and thus, to achieve high-speed or high-resolution pulse modulation signal generation. Alternatively, regarding VCLK as an original clock signal of the clock generation part, the high frequency clock signal can be expressed as a clock signal having the rate twice the original clock signal. As to generation of the clock signal VCLK and inverted clock signal VCLKB, description will be made later.

Figure 14:
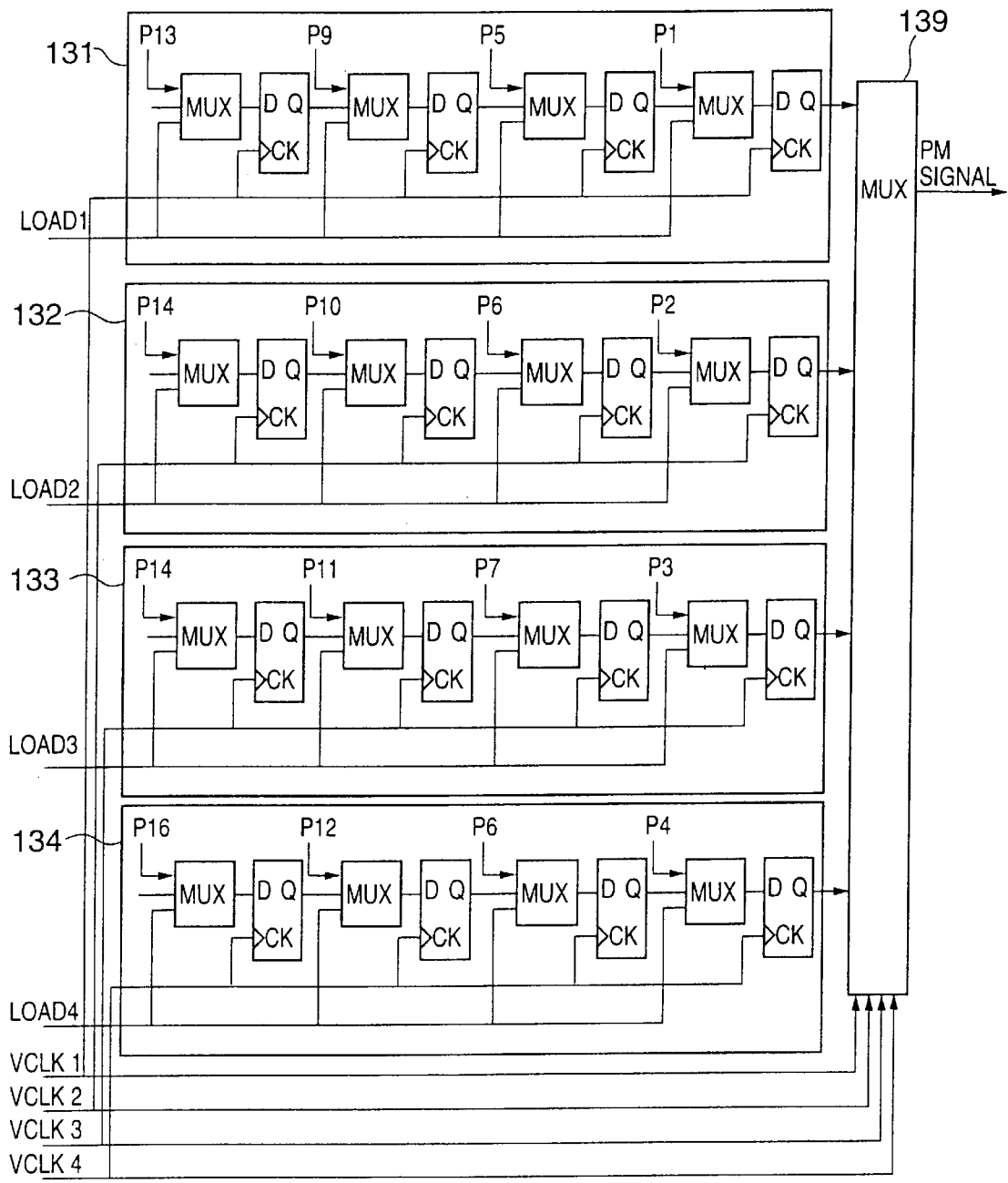

The configuration of FIG. 13 is developed into that of FIG. 14, and an example of configuration in case of making the serial modulation signal generation part 13 in four rows of shift registers is illustrated in FIG. 14. The shift registers 131 through 134 on the respective rows are given four phase clock signals VCLK1, VCLK2, VCLK3, and VCLK4 having phases different sequentially from the top, and load signals LOAD1, LOAD2, LOAD3, and LOAD4 which synchronized with the respective clock signals input thereto. The modulation data is of 16-bit pulse sequences P1 through P16.

To the shift register 131, P1, P5, P9, P13 are provided; to the shift register 132, P2, P6, P10, P14 are provided; to the shift register 133, P3, P7, P11, P15 are provided; and to the shift register 134, P4, P8, P12, and P16 are provided. Then, they are selected by a MUX part 139 according to VCLK1 through VCLK4, and, thus, P1, P2, P3, . . . , P15 and P16 are selected in sequence thereby as a pulse sequence.

Figure 16:
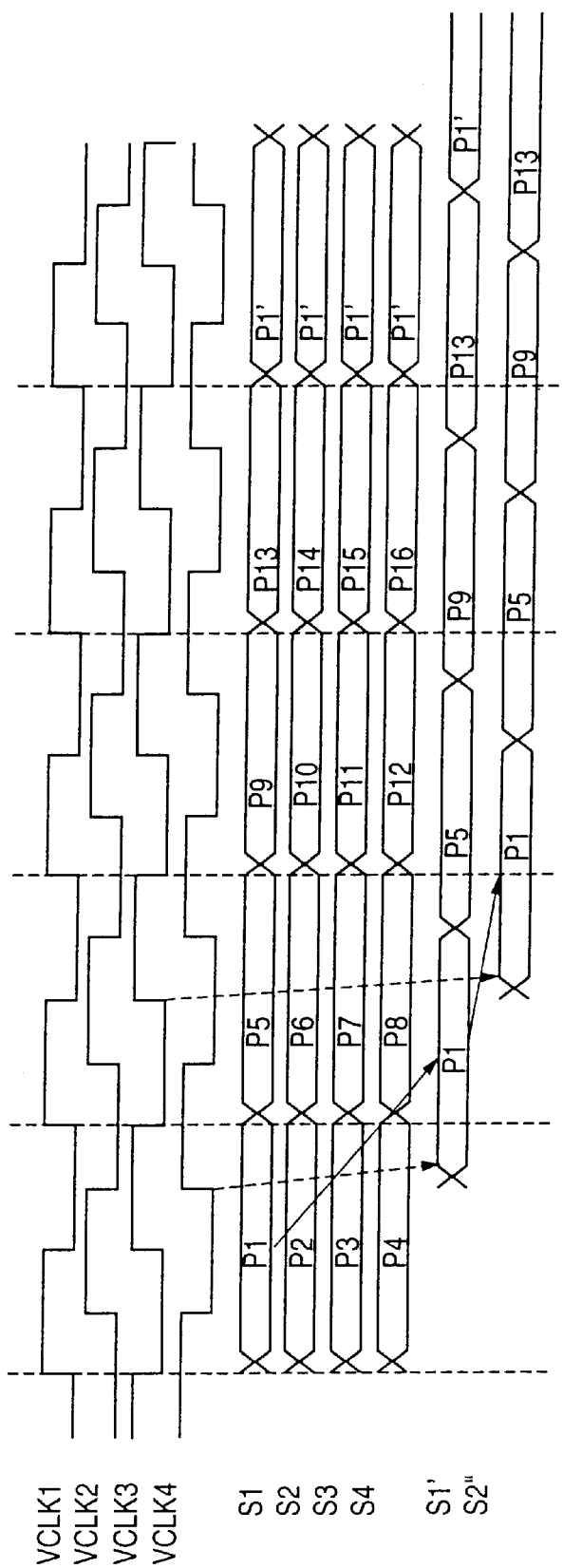
FIG. 16 illustrates timing charts of signals on the configuration shown in FIG. 15.

FIG. 16 shows an example of four-phase clock signals. As shown in the figure, by employing VCLK1, VCLK2, VCLK3, and VCLK4 which are different by $\pi/2$ (90°) from each other in sequence, without generation of a clock signal four times the frequency of VCLK, it becomes possible to output a pulse sequence selectively one by one from the four rows of shift registers 131 through 134 shown in FIG. 14.

Furthermore, by employing multi-phase clock signals different each by $\pi/4$, $\pi/8$, or so, it is possible to output pulse sequences from more rows of shift registers. Accordingly, even in case where an original clock signal of the high frequency clock signal has a not very high frequency, by employing multi-phase high frequency clock signals, it is possible to output many pulse sequences at high speed. Thus, it is possible to provide a high-resolution image. As to generation of such a multi-phase clock signals, description will be made later.

Figure 15:
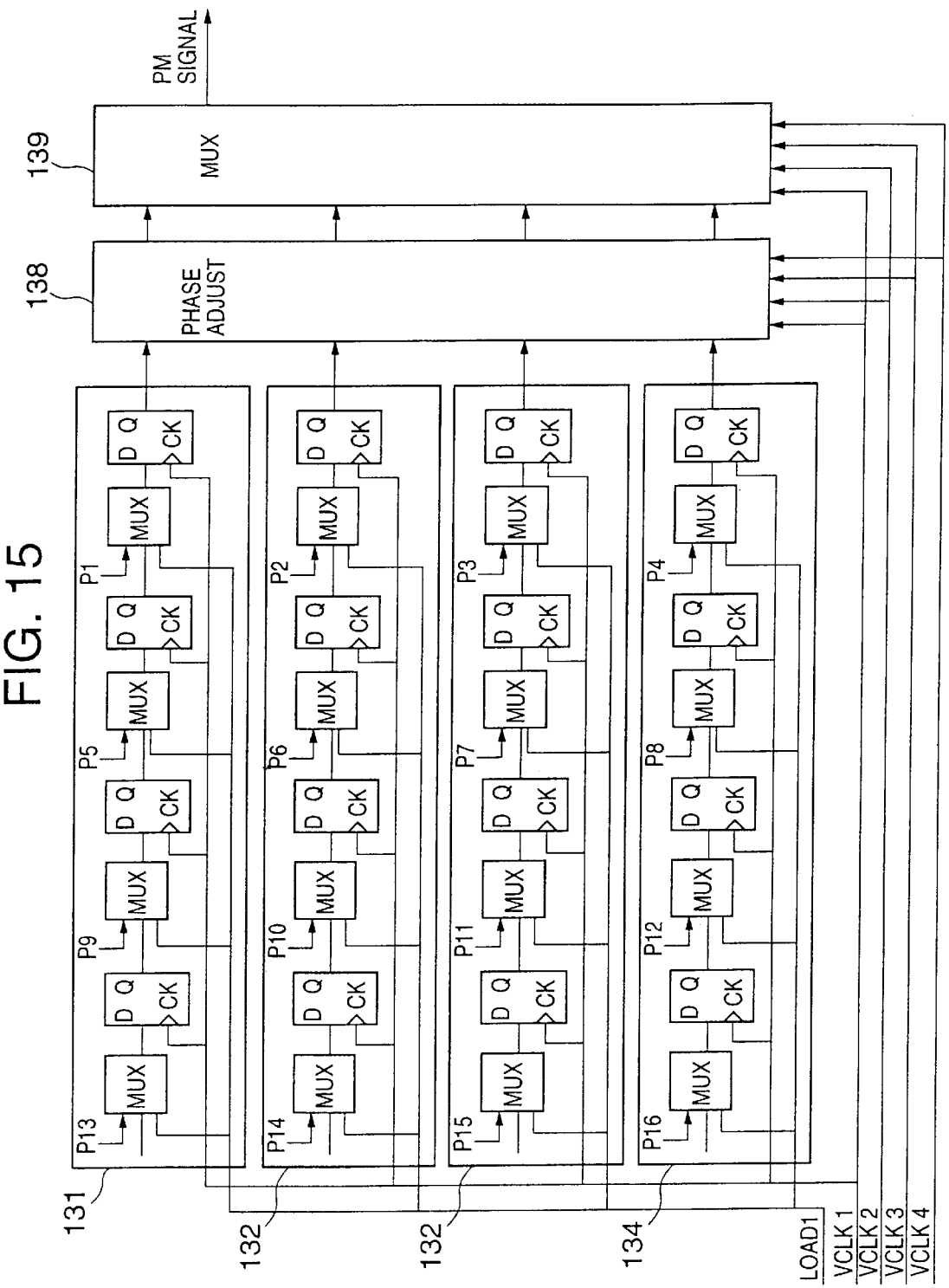

Another example of configuration in case of making the serial modulation signal generation part 13 by shift registers in four rows is shown in FIG. 15. Although a basic operational principle is the same as that of the configuration of FIG. 14, all the shift registers 131 through 134 are operated by the single VCLK1 and the load signal LOAD1 synchronized with the VCLK1, and, based on VCLK1 through VCLK4, a phase adjustment circuit 138 adjusts/controls phases of the respective outputs of the shift registers 131 through 134.

As shown in FIG. 16, data S1, S2, S3, and S4 output from the respective shift registers 131 through 134 is output in synchronization with VCLK1. For this reason, when, for example, the output S1 of the shift register 131 is made at a rising edge of VCLK1, and a decaying edge of VCLK2, a pulse cannot be latched since the timing is of an unfixed portion of the signal, as shown. However, the phase adjustment circuit 138 latches S1 by VCLK4 so as to provide it as S1', and, also, it latches S1 by VCLK3, so as to provide as S1", and, thereby, the data can be latched at a rising edge of VCLK1 and decaying edge of VCLK2.

Operation of the MUX part 139 is basically the same as that in the configuration shown in FIG. 14. As described above, as a result of selecting clock signals by which the outputs of the shift registers can be positively latched, it is possible by the configuration shown in FIG. 15 to convert the outputs of the four rows of shift registers into serial pulse series.

Thus, according to the example of configuration of FIG. 15, although the phase adjustment part which adjusts the phases of shift register outputs is needed, merely the simple configuration which supplies the same clock signal and one load pulse LOAD1 which synchronized with the same clock signal should be needed for the four rows of shift registers. Further, in this example, although the number of shift registers are maximum four, it is possible to generate a serial pulse sequence from more shift registers with the same configuration. Moreover, although the number of pulses processed by each shift register is four in this example for the simplification of description, the number of pulses processed by each shift register can be determined to be any value, depending on the resolution on one pulse, the method of generating the high frequency clock signal, etc.

Figure 17A:
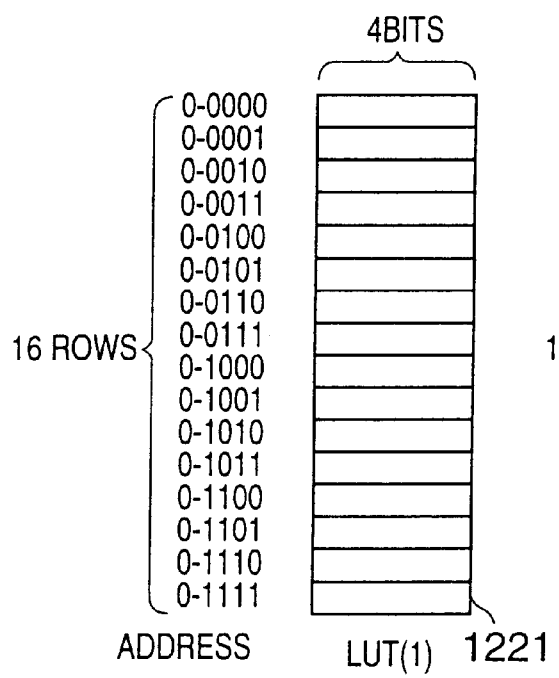
Figure 17B:
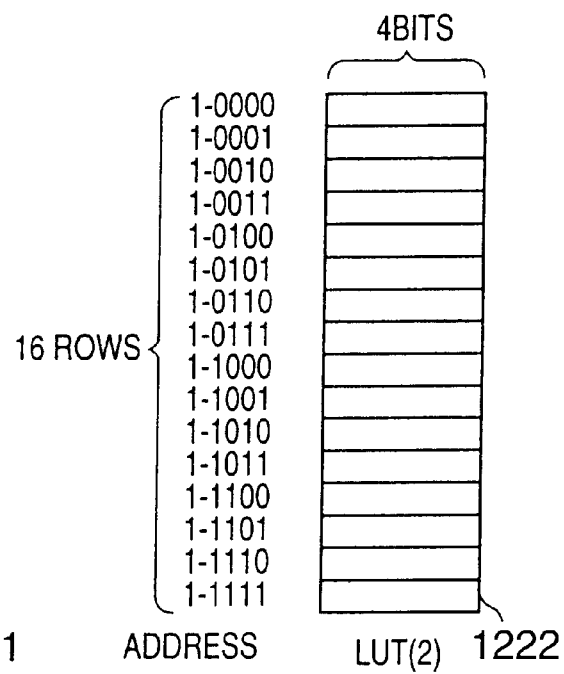

An example of configuration of the LUT suitable for the above-mentioned high resolution mode is shown in FIGS. 17A and 17B. This is an example of configuration using two LUTs (two plane) of 4 bit×16 row configuration as shown in FIG. 7. Address data of 5 bits is input to the LUT(1) 1221 and LUT(2) 1222, the MSB thereof is used for selection between the LUT(1) 1221 and LUT(2) 1222, and the other 4 bits thereof are used for selection of a row of the thus-selected LUT. Here, the above-mentioned high resolution mode signal (see FIG. 12) is used for the selection between the LUT(1) 1221 and LUT(2) 1222.

In the example of configuration of FIGS. 17A and 17B, a load signal is given twice for 1 dot at a time of high resolution mode. First, in synchronization with the first load signal, "0" is input as the high resolution mode signal and 4 bits are input as image data. Although the address data is of total 5 bits, i.e., this high resolution mode signal and 4 bits of image data, since the high resolution mode signal is "0" as mentioned above, the LUT(1) 1221 is selected. Then, the four bits on the relevant row thereof are output. Then, in synchronization with the second load signal, the high resolution mode signal is set to "1" and 4 bits are input as image data similarly. Consequently, the LUT(2) 1222 is selected, and, then, the four bits on the relevant row thereof are output. Thus, total 8-bit modulation data is generated on one dot by using both the LUT(1) 1221 and LUT(2) 1222 at a time of high resolution mode. The 4-bit data output from each of the LUT(1) 1221 and LUT(2) 1222 is loaded to a shift register such as that shown in FIGS. 9, 10 or 11 one by one, and is changed into a serial pulse sequence. Thereby, the pulse modulation signal of eight pulses is outputted for each dot, for example.

In a time of normal mode, a load signal is given once for 1 dot, the high resolution mode signal is set to "0", and image data is provided only by 4 bits. Thereby, the LUT(1) 1221 is selected and 4-bit data on the relevant row thereof is output. This is the same way as that in the case of LUT 1220 of the previous FIG. 6.

If one LUT which can provide total 8-bit (eight pulses) output as shown in FIGS. 17A and 17B is considered, it should be necessary to prepare an LUT of $2^8$=256 rows. In contrast thereto, by preparing two LUTs (two planes) each having 16 rows as shown in FIGS. 17A and 17B, 256 different outputs can be obtained from LUTs of 32 rows each. Thus, miniaturization of the memory and power saving can be realized. Moreover, the configuration of the shift register should not be differed in response to switching between the normal mode and high resolution mode, basically.

Another example of configuration of LUT suitable for the above-mentioned high resolution mode is shown in FIGS. 18A through 18F. In FIGS. 18A through 18G, LUT(1) 1221 and LUT(2) each of 16 bit×$2^{16}$ row configuration, LUT(3) 1223 and LUT(4) 1224 each of 14 bit×$2^{14}$ row configuration, and LUT(5) 1225 and LUT(6) 1226 each or 18-bit×$2^{18}$ row configuration are used. As to the address, 19 bits are applied on LUT(1) 1221 and LUT(2) 1222; 17 bits are applied on LUT(3) 1223 and LUT(4) 1224; and 21 bits on LUT(5) 1225 and LUT(6) 1226. The 3 most significant bits thereof are used for selection from among LUT(1)1221 through LUT(6) 1226. Specifically, among these 3 most significant bits of the address, the first MSB and second MSB are used for selecting a group LUTs having 16, 14 or 18 output bits, the third MSB thereof is used for selecting one of the thus-selected group of LUTs. This above-mentioned high resolution mode signal is used as the third MSB, and in case of the high resolution mode, the two LUTs are selected by the first and second MSB.

Thus, in the example of configuration of FIGS. 18A through 18F, as for the output modulation data, through a combination of the high resolution mode signal and the two most significant bits of the address, it is possible to select one of six types (14, 16, 18, 28, and 32 or 36 bits) of output arbitrarily. Selection of LUT can be easily made by arranging an address decoder in front of LUT(1) 1221 through LUT(6) 1226, thereby decoding these 3 most significant bits of the address by the address decoder, and thus, selecting LUT is made by the decoding result. Moreover, in case the number of bits of the address used for selection of LUT is made to increase, the combination of selection of LUT may be increased, consequently the available combination of the number of bits on output modulation data can be further increased.

In the example of configuration of FIGS. 18A through 18F, operation at a time of high resolution mode is the same as that in the example of configuration of FIGS. 17A and 17B basically. That is, on the first load signal, the high resolution mode signal is set as "0", and, then, it is set as "1" on the second loading. The two most significant bits of the address are set up according to the number of bits of the modulation data needed. For example, when the two most significant bits are "00", on the first load signal, LUT(1) 1221 is selected, 16-bit data of the relevant sequence is output, then, LUT(2) 1222 is selected on the second load signal, 16-bit data of the relevant sequence is output, and thus, total 32-bit modulation data is output. Similarly, when the two most significant bits are "01", total 28-bit modulation data is output by LUT(3) 1223 and LUT(4) 1224 through the first and second load signal.

Although the configuration shown in FIGS. 18A through 18F illustrate an example of using LUTs for pulse sequence conversion, the same functions may also be achieved by using a decoder instead. The decoder may be formed not only by a hardware but also by a software. Moreover, a bit compression/decompression circuit may be inserted between LUTs and shift registers so as also to achieve pulse sequence conversion.

Figure 19:
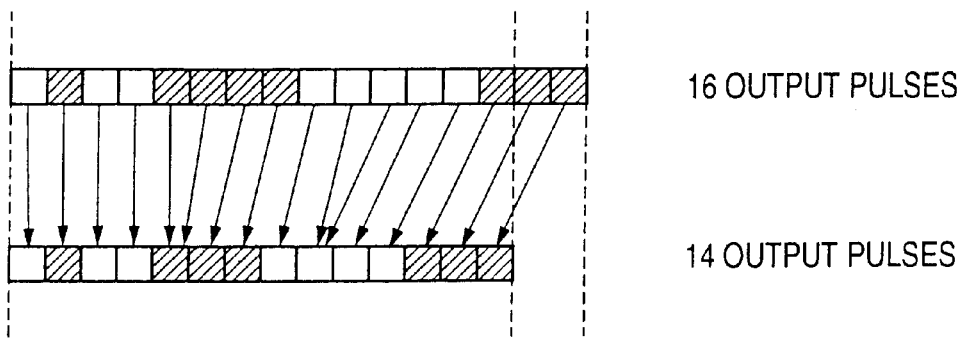
FIGS. 19, 20 and 21 illustrate examples of manner of changing output pulse sequence according to the present invention with reference to FIG. 1.

FIG. 19 illustrates one example of pulse sequence conversion according to the present invention. FIG. 19 shows one example which changes an output pulse pattern of 16 pulses into an output pulse pattern of 14 pulses. In outputting, if the last two pulses are removed from the output pattern which are of 16 output pulses as shown in FIG. 19, the density there is changed from 8/16 to 6/14 (assuming that the density is in proportion to the number of pulses there). In order to avoid such a change in density (gray scale), the pattern data should be changed as shown by arrows in FIG. 19 by means of a memory or a decoder. Thereby, the density does not change as being from 8/16 into 7/14 even through the pause number reduction. Moreover, even when the density is not in agreement exactly before and after pulse number reduction, it becomes possible to control the density change to the minimum by having a conversion part performing pulse number change such that the density change occurring thereby become minimum.

Figure 20:
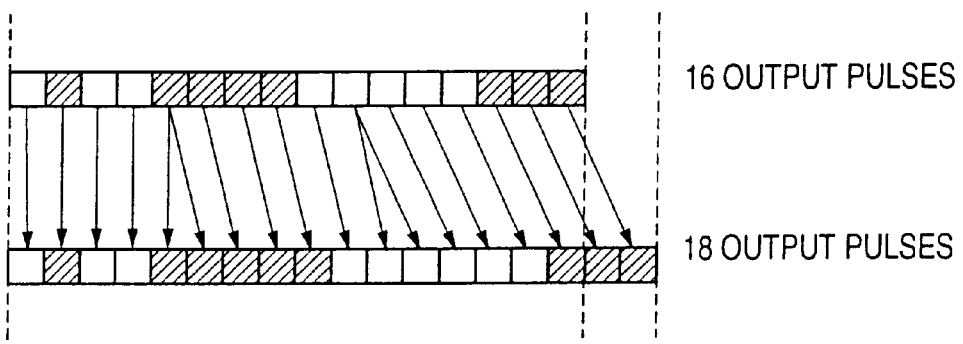

Another example of the pulse sequence conversion according to the present invention is shown in FIG. 20. FIG. 20 shows one example which changes an output pulse pattern of 16 pulses into an output pulse pattern of 18 pulses. Like in FIG. 19, a conversion part which carries out data conversion is configured such that the density on a pulse sequence may be made in agreement as much as possible before and after the conversion, and in this example, the density is changed from 8/16 to 9/18. Thus, an image formation device of high resolution in which image density etc. is not affected even in case the number of pulses is changed by having such a data conversion part can be achieved. Moreover, although the number of pulses is assumed as 16 in this example for the sake of simplification of description, since a data conversion part can perform finer data conversion as the number of pulses of the pulse sequence is larger, it is possible to achieve pulse number change with a less change in image density.

Figure 21:
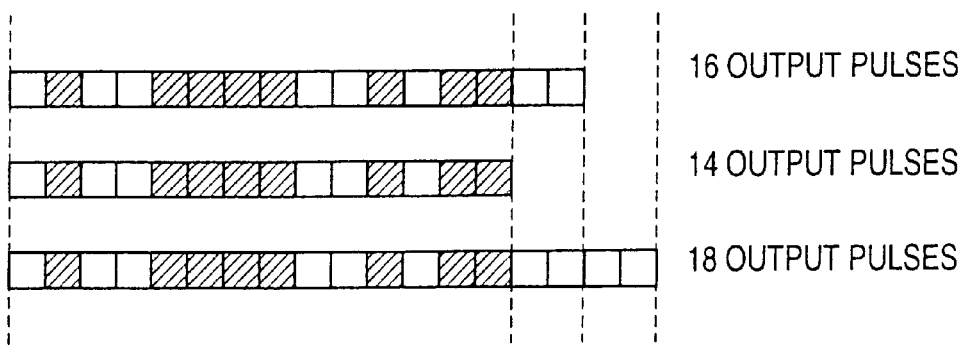

Another example of the pulse sequence change according to the present invention is shown in FIG. 21. A concept of a configuration shown in FIG. 21 is different from those shown in FIGS. 19 and 20. As shown in FIG. 21, although the number of pulses to output is changed between 14, 16, and 18, pulses (white or black) which can actually be output are 14 pulses counted from the left end. In such a case, as shown in the figure, the change in number of pulses is achieved by controlling the number of 'white' pulses present at the right end. For example, since a beam has a Gaussian distribution on a photoconductor even when output is made at a duty ratio of less than 100%, in a case of raster-scanning type image formation device, it is possible to output a completely black image. For this reason, a configuration can be achieved which changes the number of pulses without changing data pattern in a condition in which the maximum duty ratio applied is 14/18≈77.8% as in the example shown in FIG. 21.

Next, an example of a circuit suitably used for the above-mentioned high frequency clock generation part 11 of FIG. 1 or FIG. 12 will now be described.

Figure 22:
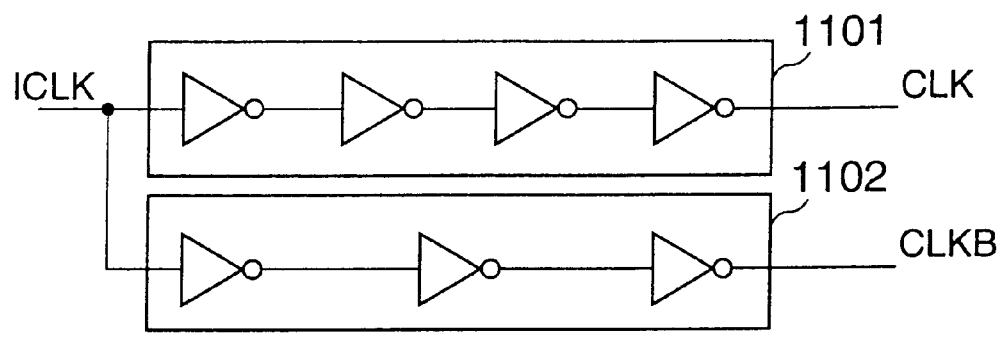
FIG. 22 illustrates an example of configuration of inversion clock generation circuit which can be used in the present invention with reference to FIG. 1.

An example of an inversion clock generation circuit is shown in FIG. 22. This circuit generates normal and inverted clock signals CLK and CLKB (different in phase by π; 180°) by determining an output through an odd number of inverters as CLK while determining an output through an even number of inverters as CLKB. The thus-obtained normal and inverted clock signals CLK and CLKB are used as the above-mentioned high frequency clock signals VCLK and VCLKB on the shift registers shown in FIG. 13.

Figure 23:
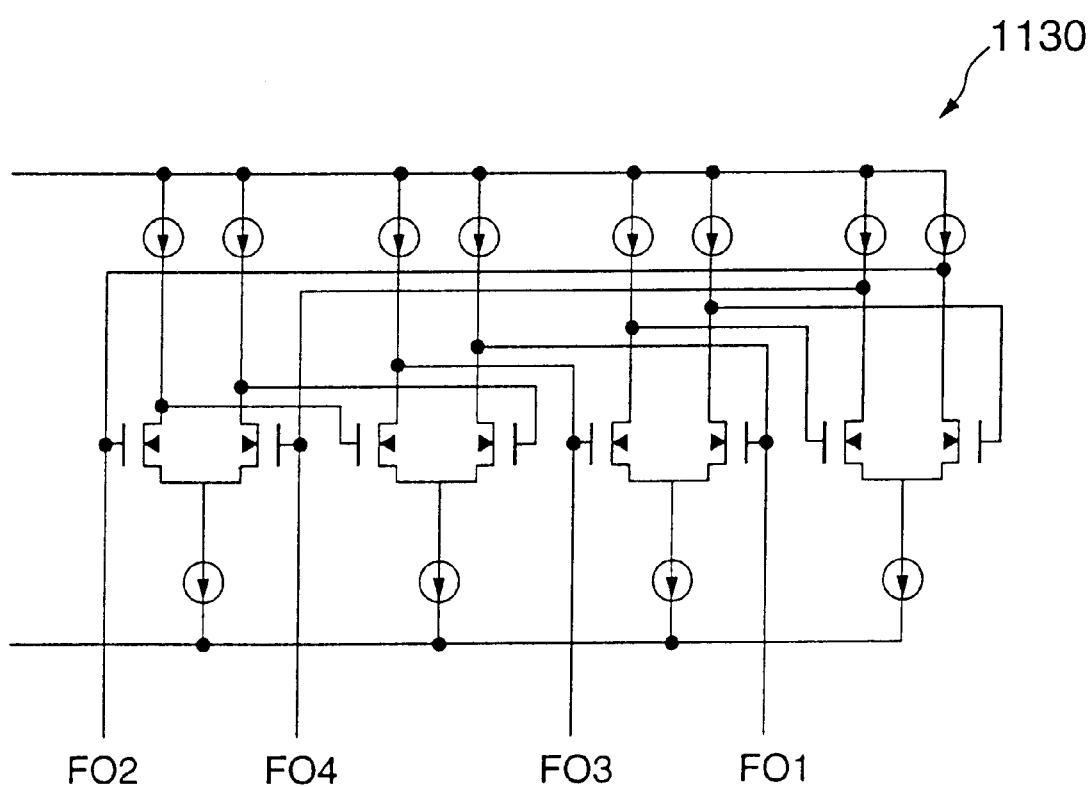
FIG. 23 illustrates a specific example of multi-phase clock generation circuit which can be used in the present invention with reference to FIG. 1.
Figure 24:
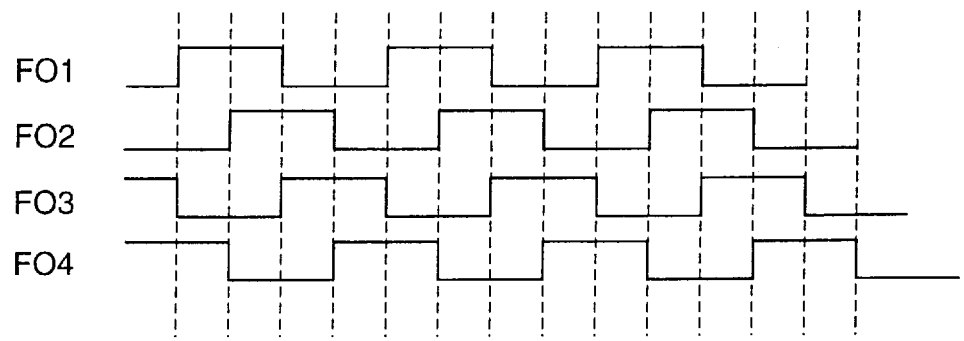
FIG. 24 illustrates timing charts on signal on the configuration shown in FIG. 23.

One example of the above-mentioned multi-phase clock generation circuit is shown in FIG. 23, and operation timing thereof is shown in FIG. 24. FIG. 23 shows an example of configuration of VCO 113 of FIG. 12. In this example, the VCO 113 includes four stages of differential-type ring oscillator 1130, and, the outputs F0, F02, F03, and F04 thereof are clock signals having four different phases different by π/2 (90°) as shown in FIG. 24. These clock signals F01, F02, F03, and F04 are used as the high frequency clock signals VCLK1, VCLK2, VCLK3, and VCLK4 on the shift registers shown in FIG. 14 and FIG. 15.

Thus, it becomes possible to generate normal and inverted clock signals different in phase by π (180°) without employing an inversion clock generation part as shown in FIG. 22 through a simple configuration by employing a differential-type ring oscillator. Further, as shown in FIG. 23, as a configuration of even number of stages may be made, and an output may be taken from intermediate portions, it is possible to generate a clock signal having a desired phase.

Since, from the differential stages, output is taken every two stages, the clock signals of four phases different by π/2 (90°) each are obtained in the example of configuration of FIG. 23. However, when output is taken every stage, output of clock signal of 8 phase different by π/4 (45°) each can be obtained. Similarly, by creating an odd number of stages, for example, a three-stage configuration, a configuration which can also generate clock signals of six phases different by π/3 (60°) each can be achieved. Thus, it is possible to create a configuration which can generate a desired number of phases of clock signals accordingly.

Figure 25:
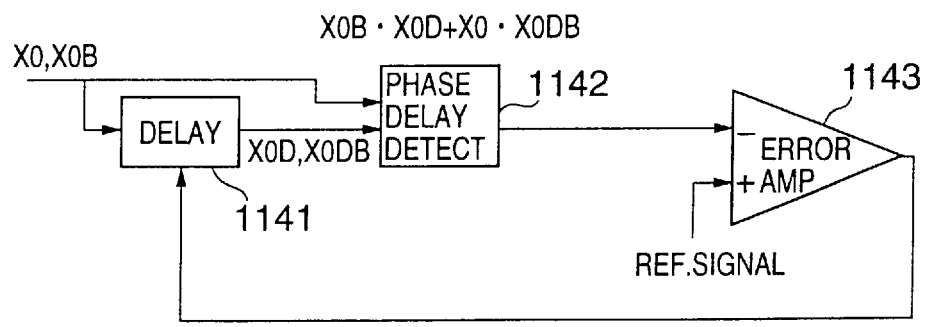
FIG. 25 shows a circuit diagram of delay amount control part which may be used in another example of multi-phase clock generation circuit which can be used in the present invention with reference to FIG. 1.

One example of a delay control part used for a circuit which generates these multi-phase clock signals different in phase is shown in FIG. 25, and the phase difference is controlled thereby. A clock signal X0 and inverted clock signal X0B thereof generated by an inversion clock generation part as shown in FIG. 22 or the like, etc. are input into a delay part 1141, and after that, the delayed signals X0D and X0DB are input into a phase delay detection part 1142. Then, the original and delayed signals X0, X0B; and X0D; X0Db are compared with one another, and, the thus-obtained/detected delay amounts is compared with a reference value by an error amplifier 1143. Then, by using the output of the error amplifier 1143, the delay amounts are controlled appropriately.

Figure 26:
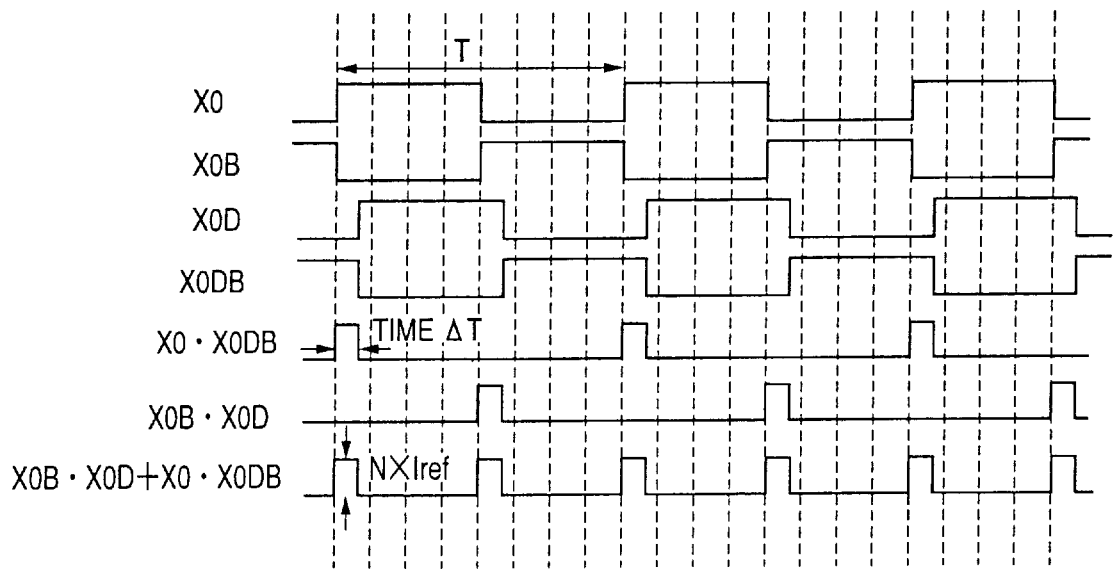
FIG. 26 illustrates timing charts on signal on the configuration shown in FIG. 25.

FIG. 26 shows timing in operation of the delay amount control part shown in FIG. 25. First, a time ΔT is delayed by the delay part 1141, and clock signals X0 and X0B thus turn into those X0D and X0DB. A logic of the phase delay detection part 1142 is expressed as follows:

$$C = X0 \cdot X0DB + X0B \cdot X0D$$

where the output thereof is expressed by C. The reason why the logic of the phase delay detection part 1142 is determined in this way is to enable detection of the phase delay amount even when the duty ratio of the input pulse X0 and X0B is not 50%. In this case, the output signal C of the phase delay detection part 1142 is such that in which a pulse on delay time ΔT occurs each T/2 period. Here, the output signal C of the phase delay detection part 1142 is of an electric current, and is expressed by a current value N×Iref.

The error amplifier 1143 compares the current output C of the phase delay detection part 1142 with a reference current Iref used as the reference signal, and generates an electric current Idelay by which the amount of delay of the delay part 1141 is determined. Since an integration value of an integrated waveform of C coincides with Iref when setting is made such that N=4, in case the delay time is such that ΔT=T/8. Accordingly, in this case, the amount of delay of the delay part 1142 is controlled so that the delay time ΔT=T/8. Generally, Delay time ΔT=T/2N.

Accordingly, it is possible to obtain a pulse signal having controlled for the delay time ΔT thereof freely in a range of half the period 1/T of the input signal X0 as a result of setting N appropriately.

Figure 27:
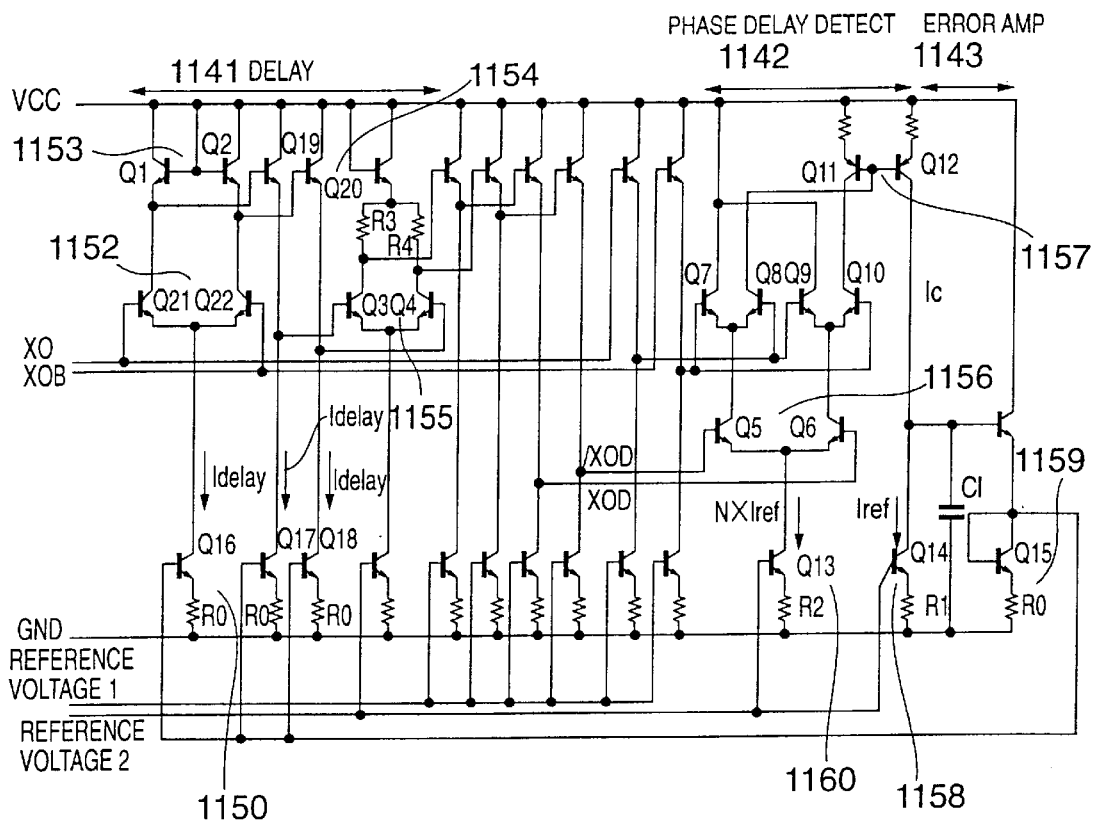
FIG. 27 shows a circuit diagram of a specific configuration of a delay amount control part shown in FIG. 25.

FIG. 27 shows an example of a specific circuit which forms the delay amount control part shown in FIG. 25 by using bipolar transistors. The current Idelay which determines the amount of delay in the delay amount generation part 1141 is generated by a current source 1150 including transistors Q16 through Q18 and a resistor R0. The input pulse signals X0 and X0B are delayed by a diode load circuit 1153 of transistors Q1 and Q2, and an emitter follower circuit 1154 of transistors Q19 and Q20 through a differential circuit 1152 of transistors Q21 and Q22.

As the output of the diode load circuit 1153 of the transistors Q1 and Q2 has a very small amplitude, the swing is adjusted as a result of the output signal of the emitter follower circuit 1154 of the transistors Q19 and Q20 being output through a binarization circuit of transistors Q3 and Q4 and resistors R3 and R4. An ECL logic circuit 1156 of transistors Q5 through Q10 outputs the following signal C:

$C = X0B \cdot X0D + X0 \cdot X0DB$ where the input signals X0D, X0DB are given by the binarization circuit 1155. The output current Ic thereof is then compared after being inverted by a current mirror circuit 1157 transistors Q11 and Q12, with a reference current Iref generated by a transistor Q14 and a resistor R1. The collector of the transistor Q14 which is a comparison part 1158 has a high impedance, and also, a capacity C1 is connected toward the ground GND. Thereby, Ic is compared with Iref and the comparison output is taken as an electric current generated by a current source 1159 of a transistor Q15 and a resistor R0.

Here, the current sources 1150 and 1159 of transistors Q15–Q18 and resistors R0 form current mirror circuits as the currents which flow therethrough become the same as a result of the emitter resistor of each being the same resistor R0. Accordingly, the current flows through the transistor Q15 and resistor R0 becomes Idelay. Thus, the current Idelay flowing through each current mirror circuit is controlled by the output of the transistor Q15 and resistor R0 so that the delay amount on the delay amount generation part 1141 be a predetermined delay amount.

Here, when the current of the current source 1160 of the transistor Q13 and resistor R2 is made N times of Iref, the delayed pulse signals X0D, X0DB having Delay time ΔT=T/2N as mentioned above, can be obtained. For example, for the setting such that N=4, the following setting should be made:

R1:R2=4:1;

(area factor of Q13):(area factor of Q14)=4:1 where the term 'area factor' means the emitter area. Thereby, it is possible to cause the current of 4×Iref flow through the current source 1160 of the transistor Q13 and resistor R2. Accordingly, it is possible to generate the delayed pulse signals X0D, X0DB having the delay time of ΔT=T/8, i.e., the phase delay amount of Δθ=π/4.

Figure 28:
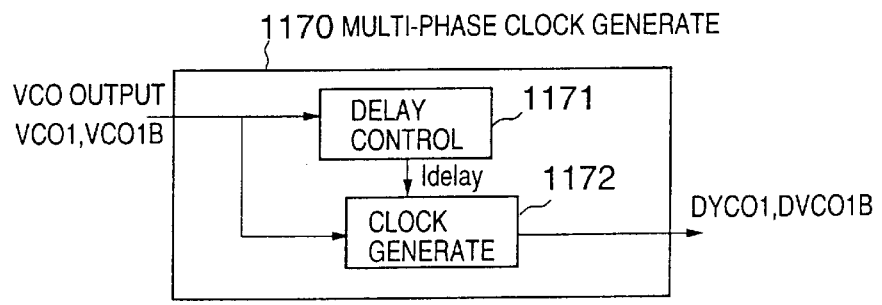
FIG. 28 shows a block diagram of a multi-phase clock generation circuit applying the delay amount control part shown in FIG. 25.
Figure 29:
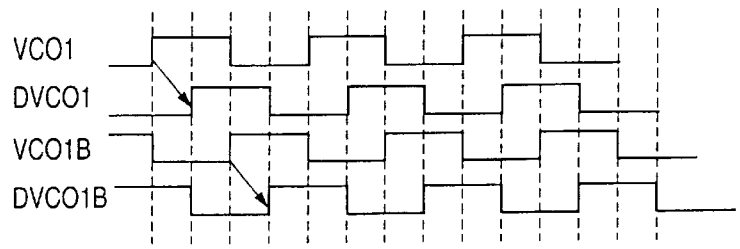
FIG. 29 illustrates timing charts on signals on the configuration shown in FIG. 28.

An example of configuration of the multi-phase clock generation circuit using the above-mentioned delay amount control part is shown in FIG. 28. For example, the clock signal VCO1 and the inverted signal VCO1B thereof generated from the output of the VCO 113 of FIG. 12 are input to the delay control part 1171 and delay clock generation part 1172 of the delay amount control part 1170. The delay amount control part 1171 includes a delay amount generation part, a phase delay detection part, and an error amplification part, as shown in FIGS. 25 and 27, and the output thereof is the control current Idelay which controls the amount of delay. The delay clock generation part 1172 is the same as the delay amount generation part 1141 shown in FIG. 27, and outputs clock signals DVCO1 and DVCO1B on which the amount of delay is controlled based on the control current Idelay. FIG. 29 shows an example of generating four-phase clock signals different in phase by 90° each from two-phase clock signals (normal and inverted).

Figure 30:
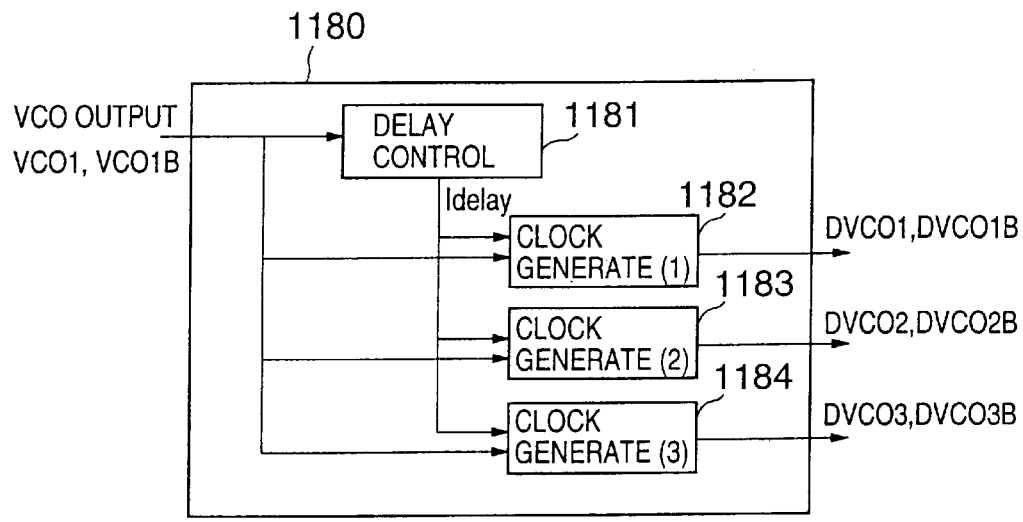
FIG. 30 shows a block diagram of another specific example of the multi-phase clock generating circuit.

A different example of configuration the multi-phase clock generation circuit is shown in FIG. 30. In this example of configuration, three delay clock generation parts 1182, 1183, and 1184 are provided, and, thus, eight-phase clock signals different 45° each in phase can be generated. Similarly, clock signals on which phase difference is controlled with respect to the VCO clock signal used as a reference signal and can set up the phase difference freely can be generated.

Figure 31:
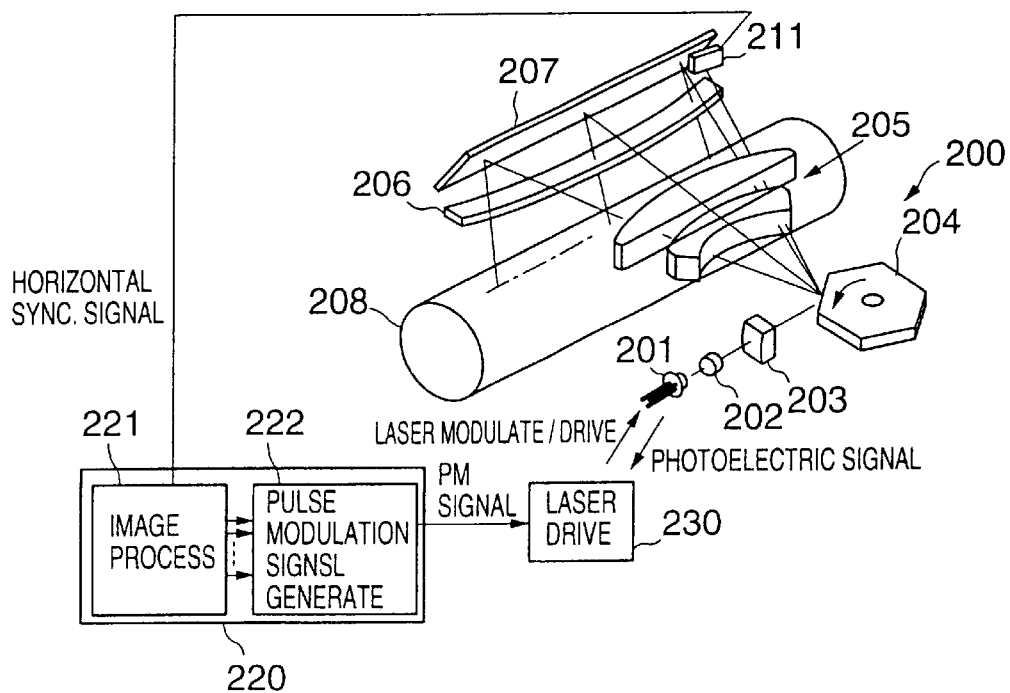
FIG. 31 shows a specific example of a semiconductor laser modulation device, an optical scanning device and an image formation device, applying the pulse modulation signal generation circuit according to the present invention with reference to FIG. 1.

FIG. 31 shows an entire configuration of a semiconductor laser modulation device, an optical scanning device, and an image formation device, which employ the pulse modulation signal generation circuit according to the present invention described above. In FIG. 31, a laser scanning optical system 200 is shown, which corresponds to a single beam scanning optical system according to the present invention. Further, as shown in the figure, an image-processing unit 220 includes an image-processing part 221 and a pulse modulation signal generation part 222. A laser drive unit 230 performs driving control of a semiconductor laser 201.

A laser beam emitted from the semiconductor laser 201 passes through a collimator lens 202 and a cylindrical lens 203, and then, deflected by a polygon mirror 204. After that, the laser beam passes through an fθ lens 205 and a toroidal lens 206, and is reflected by a mirror 208. Then, after that, the laser beam is incident on a photoconductor body 208 to form thereon an electrostatic latent image. The start position of every scan of the laser beam onto the photoconductor body 208 is detected by a horizontal synchronization sensor 211, which then provides a horizontal synchronization signal to the image-processing unit 221 of the image-processing unit 220.

In the image-processing part 221, while a pixel clock signal is generated in synchronization with the horizontal synchronization signal, an image read through an image input device, such as a scanner which is not illustrated, is input, and therefrom, image data in synchronization with the horizontal synchronization signal and the pixel clock signal is generated. This image data is generated in a form such that sensitivity characteristic of the photoconductor body should be taken into consideration. In the image-processing part 221, as shown in FIG. 12, other than the image data, the high resolution mode signal, data inversion signal, mode selection signal, load signal, etc., mentioned above, are generated, and this signal group is transmitted to a pulse modulation signal generation part 222 at a predetermined timing.

In the pulse modulation signal generation part 222, as described above, the modulation data is generated from the image data, and the pulse modulation signal PM in synchronization with the pixel clock signal is output as a result of this modulation data being converted into a serial pulse sequence. This pulse modulation signal PM is input into a laser drive unit 230, and thereby the semiconductor laser 201 in this laser drive unit 230 is controlled according to the pulse modulation signal PM.

Alternatively, in the image-processing part 221, it is possible that the modulation data is generated from image data, and is transmitted to the pulse modulation signal generation part 222. In this case, in the pulse modulation signal generation part 222, this modulation data is directly changed into the serial pulse sequence.

Moreover, a plurality of pulse modulation signal generation parts 222 should be provided in case of application of the present invention is made to a multi-beam scanning device as will be described later. In this case, these parts perform processing in parallel, and, output respective pulse modulation signals on the image data transmitted from the image-processing part 221 for the plurality of scanning lines. The basic concept thereof is shown in FIG. 32.

Figure 32:
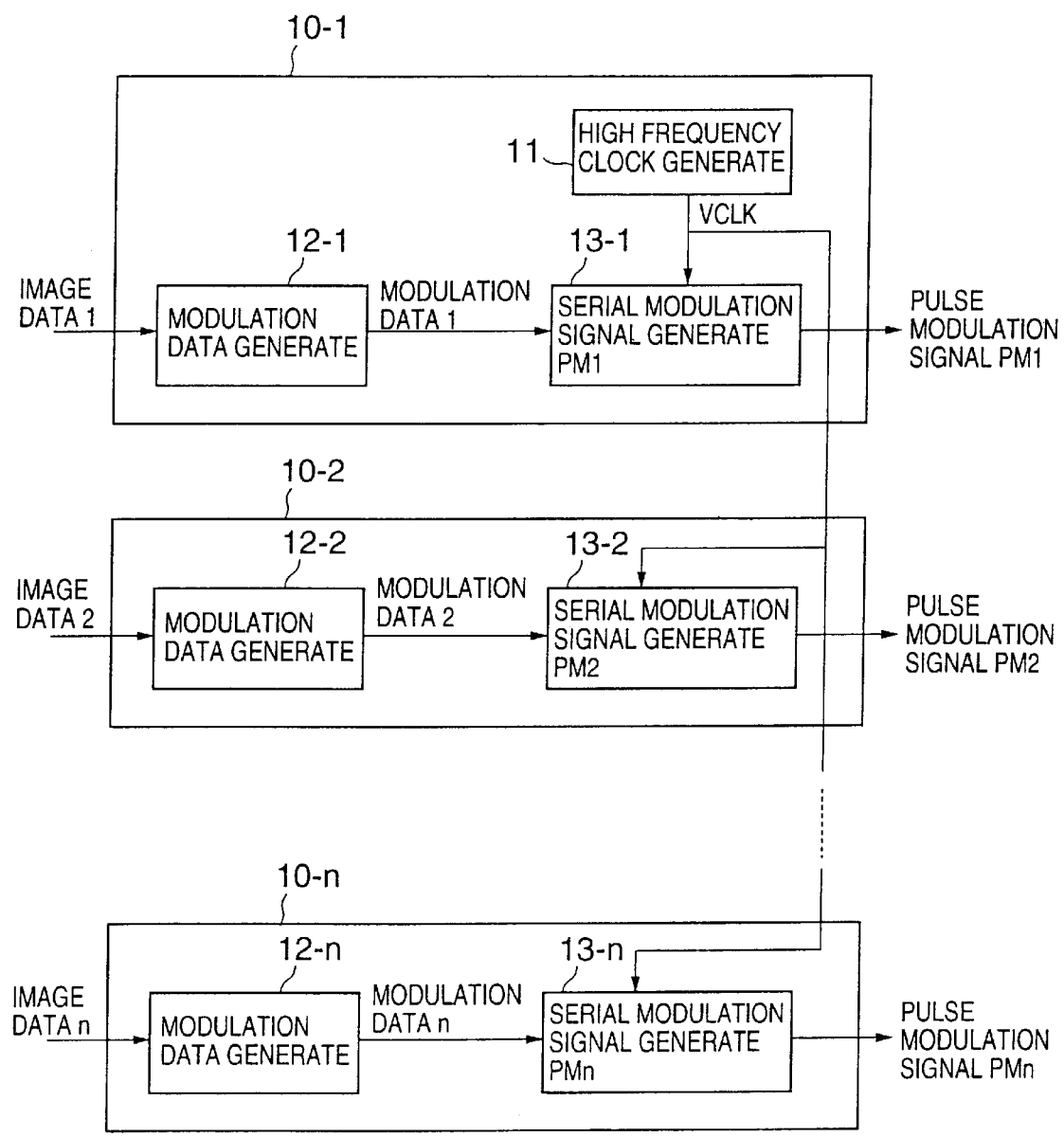
FIG. 32 shows a block diagram of a specific example of pulse modulation signal generation circuit used for a multi-beam scanning system according to the present invention with reference FIG. 1.

According to the configuration shown in FIG. 32, the n pulse modulation signal generation circuits 10 each shown in FIG. 1 are provided for n scanning lines. Then, among them, the high frequency clock generation part 11 is provided only for the pulse modulation signal generation circuit 10-1, and the pulse modulation signal generation circuits 10-1 through 10-n share this high frequency clock signal generated in the high frequency clock generation part 11 of the pulse modulation signal generation circuit 10-1.

Figure 33:
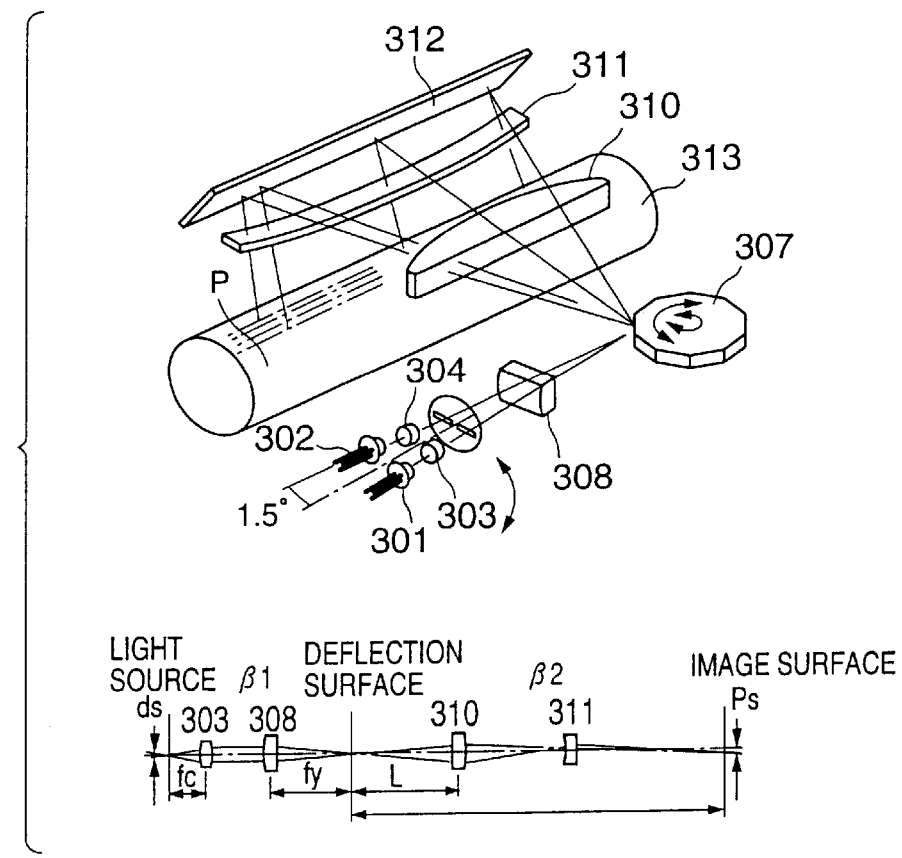
FIG. 33 shows an overall configuration of a multi-beam scanning device used in an image formation device according to the present invention with reference to FIG. 1.
Figure 34:
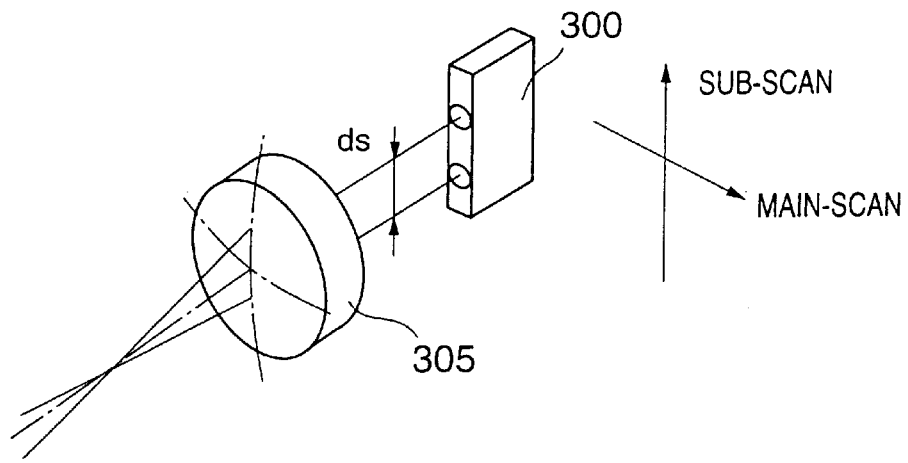
FIG. 34 shows a configuration of a two-channel semiconductor laser array useable in the device shown in FIG. 33.

A configuration diagram in one example of the above-mentioned multi-beam scanning device (multi-beam optical system) is shown in FIG. 33. In this example, as shown in FIG. 34, using n=2 semiconductor laser array 300 in which two light sources are arranged by a monolithic manner at intervals of ds=25 μm, disposed symmetrically with respect to the optical axis of a collimator lens 305 along a sub-scanning direction.

In FIG. 33, the semiconductor laser arrays 301 and 302 are made coincidence in the optical axes with those of collimator lenses 303 and 304, the light emission directions thereof has an angle therebetween symmetrically with respect to a main scanning direction. and an arrangement is made such that the light emission axes thereof may cross at a reflection point of the polygon mirror 307. A plurality of beams emitted from each semiconductor laser array 301, 302 pass through a respective one of the cylindrical lenses 308, and, after that, they are collectively deflected by the polygon mirror 307, and then, through an fθ lens 310, toroidal lens 311, and mirror 312, the deflected beams are imaged on and scan with the beam spots a photoconductor body 313.

Printing data for one scan line (image data) for each light source is stored by a buffer memory in the image-processing part 221, and is read out therefrom every surface of the polygon mirror. Thus, through the pulse modulation signal generation part 222 and the laser drive unit 230, recording is made every four lines simultaneously.

Figure 35:
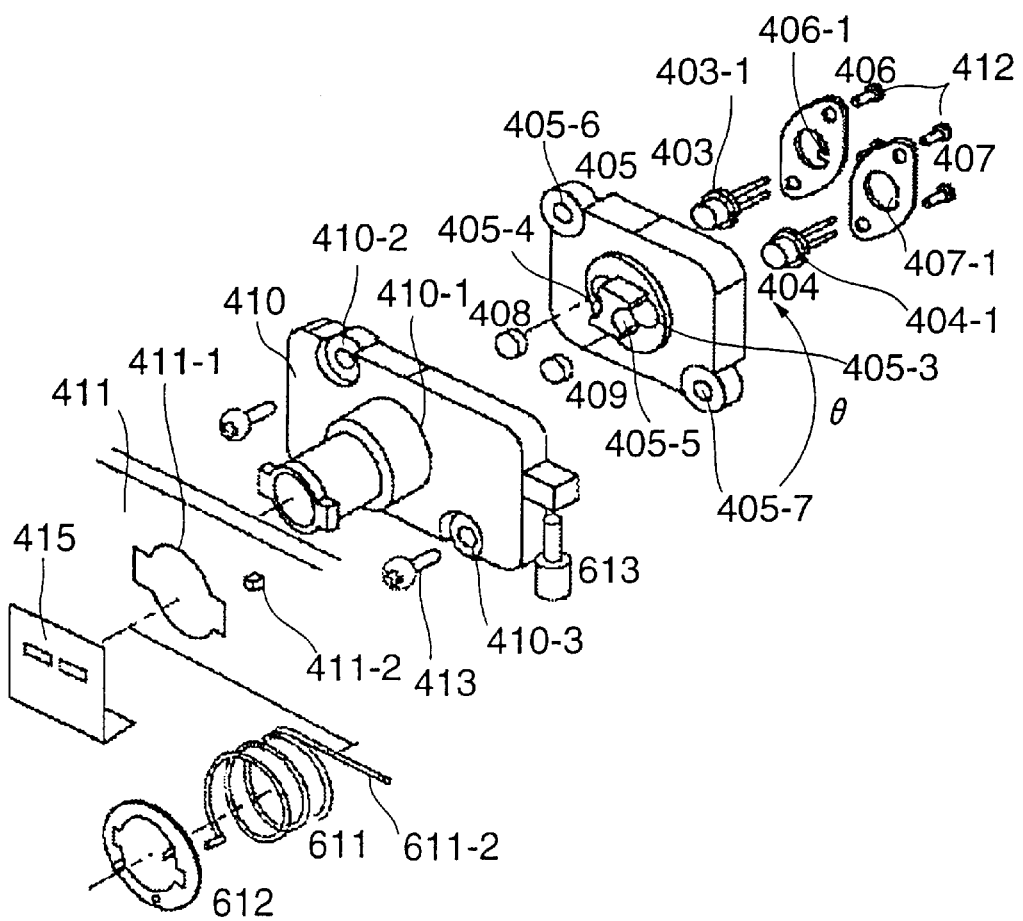
FIG. 35 shows a configuration of a light source unit of multi-beam scanning device usable in the device shown in FIG. 33.

FIG. 35 shows a configuration of the above-mentioned light source unit. The semiconductor laser arrays 403 and 404 are fixed onto a rear surface of a base member 405 slightly inclined by approximately 1.5° at fitting holes thereof with heat-sink parts 403-1, 404-1 thereof. There, fixing parts 406, 407 are fixed in a manner such that the projections 406-1, 407-1 thereof are aligned with cut-out parts of the heat-sink parts, and, also, the directions of the light sources are appropriately adjusted, with screws 412. Further, the collimator lenses 408 and 409 are adhered onto the base part 405 along hemispheric mounting guide surfaces 405-4, 405-5 so that the optical axes thereof are adjusted, and, also, positioning thereof is performed so that the divergent beams emitted are made to be parallel beams.

In order to make setting such that the light beams from each semiconductor laser array may cross on the main scanning plane as mentioned above, the fitting holes 405-1 and 4-5-2, and the mounting guide surfaces 405-4 and 405-5 are inclined appropriately.

The base member 405 is engaged with a holder member 410 by a cylindrical engagement part 405-3, then, screws 413 are screwed into thread holes 405-6, 405-7 via through holes 410-2, 410-3. Thus, the light-source unit is formed.

Figure 37:
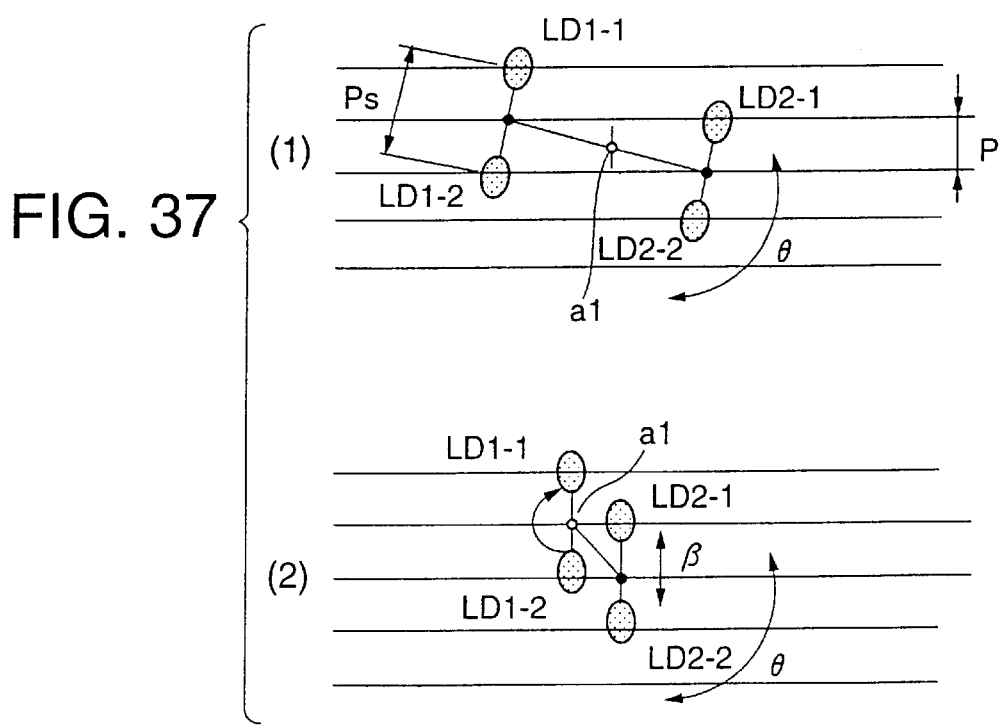
FIG. 37 illustrates beam spot arrangements made by the light-source units shown in FIGS. 35 and 36.

In the light-source unit, a cylindrical part 410-1 of the holder member is fitted into a reference hole 411-1 formed in a mounting wall 411 of an optical housing, a spring 611 is inserted from the front side, and a stopper member 612 is engaged with a cylindrical part projection 410-3, so that the holder member 410 is fixed onto and held by the rear surface of the mounting wall 411. At this time, a torque is generated with a rotation axis corresponding to the central axis of the cylindrical part as a result of one end of the spring is hooked with a projection 411-2. Then, by an adjusting screw 613 provided such as to be against the torque, the entire unit is rotated about the optical axis in θ direction. Thus, as shown in FIG. 37, (1), the respective beam spots are arranged alternately shifted by one scan line.

A slit is prepared for every semiconductor laser array in an aperture 415 attached in the optical housing, and thereby defines the diameter of the optical beam.

Figure 36:
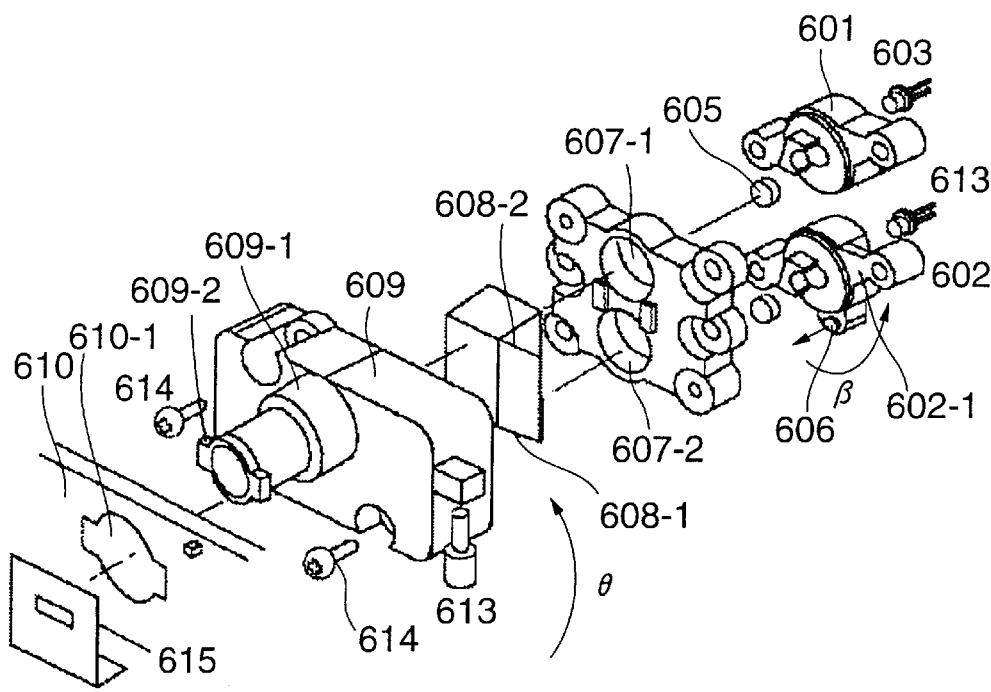
FIG. 36 shows another example of configuration of the light source unit of multi-beam scanning device usable in the device shown in FIG. 33.

FIG. 36 shows another example of the light source unit in which laser beams emitted from two semiconductor laser arrays are combined by a beam combining unit. The semiconductor laser arrays 603, 613 and collimator lenses 605, 606 are, similar to the example shown in FIG. 35, supported by respective base members 601 and 602, and, thus, first and second light source parts are configured. The first and second base members 601 and 602 are fixed onto a common flange member 607 by screw while cylindrical parts thereof are engaged with holes 607-1, 607-2. An adjustment screw 606 is screwed into the second base member 602, and, by adjusting the projection amount thereof from the rear side, arm parts 602-1 are twisted so that only a holding part of the semiconductor laser array and coupling lens can be inclined along the sub-scanning direction β. Thereby, a beam spot arrangement is shifted by one scan line, and, thus, the arrangement shown in FIG. 37, (2) is obtained.

A prism 608 in combination of a parallelogram prism and a triangular prism reflects each beam from the second light-source part by an oblique surface 608-1, and, also reflects by a beam splitter surface 608-2, so as to emit the beams close to the beams from the first light-source part. The beams which have been thus made to be close together are deflected by the polygon mirror together, and, thereby, form images on the photoconductor body as beam spots. An aperture 615 is also supported by the optical housing. As the beams from the semiconductor laser arrays are collected together, a single slit 615 is provided there. The above-mentioned flange member 607 is supported by a holder member 609, and, same as in the above-mentioned example, as a result of a cylindrical part 609-1 thereof being fitted into a reference hole 610-1 formed in a mounting wall 610, and the entire unit being rotated thereabout, the inclination of the arrangement of the respective beam spots is adjusted.

Figure 38:
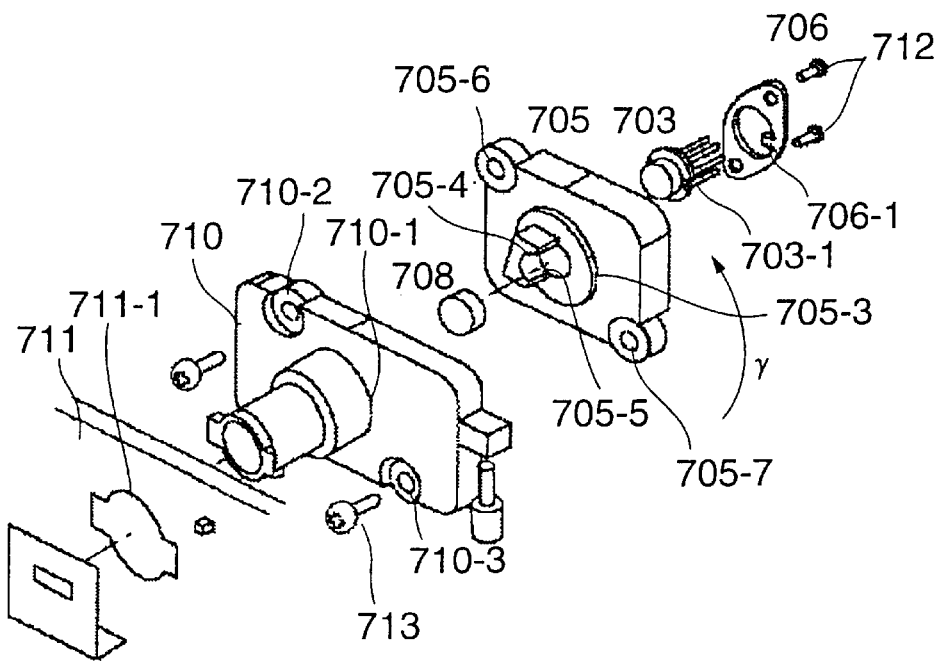
FIG. 38 shows a specific configuration of another example of light source unit of multi-beam scanning device usable in the device shown in FIG. 33.
Figure 39:
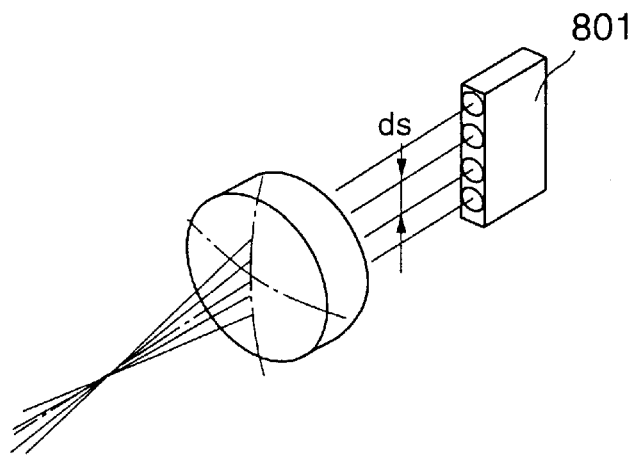
FIG. 39 shows a configuration example of a four-channel semiconductor laser array.

FIG. 38 shows an example of configuration of the multi-beam scanning device using a four-channel semiconductor laser array 801 as shown in FIG. 39. Since the configuration is the same as that of FIG. 35 and FIG. 36, duplicated description is omitted here.

Figure 40:
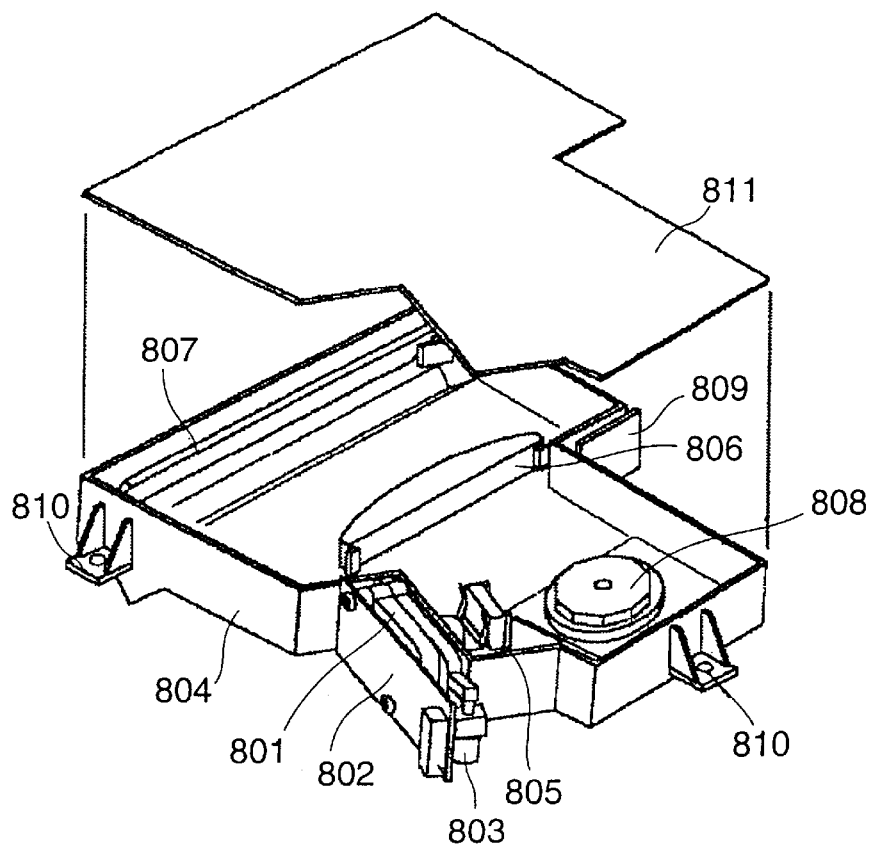
FIG. 40 shows a state in which the multi-beam scanning device is mounted in an optical housing according to the present invention with reference to FIG. 1.

FIG. 40 illustrates a multi-beam scanning device (optical scanning device) formed as a result of the light source unit shown in FIG. 35 is mounted in an optical housing 804. A printed circuit board 802 having a drive circuit formed therein which manages control of the semiconductor laser is loaded onto a rear surface of the above-mentioned light source unit 801, while the above-mentioned spring is made come into contact with a wall of the optical housing which intersects perpendicularly with the optical axis. There, the inclination thereof is adjusted with an adjustment screw 803. Here, the control circuit carries out modulation control of the laser light (laser beam) of the semiconductor laser based on the pulse modulation signal output from the pulse modulation signal generation circuit according to the present invention described above. The adjustment screw 803 is screwed into a projection part formed on the housing wall.

In the optical housing, the above-mentioned cylindrical lens 805, polygon motor 808 driving the polygon mirror, fθ lens 806, toroidal lens, bending mirror 807 are positioned and supported. Further, the printed circuit board 809 having the synchronization detection sensor mounted thereon is loaded outside on the housing wall, same as the light-source unit. The top of the optical housing is sealed by a cover 811, and is screwed onto a frame member of the image formation device with a plurality of mounting parts 810 projecting from the wall.

Figure 41:
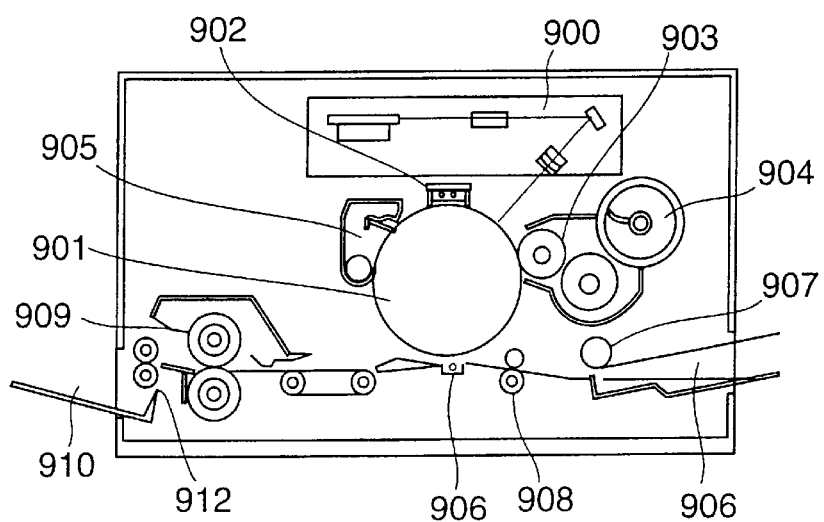
FIG. 41 shows an example of image formation device applying the optical scanning device according to the present invention with reference FIG. 1.

FIG. 41 shows an example of the image formation device carrying the above-mentioned optical scanning device. A toner cartridge 904 which supplies toner to an electrification charger 902 charging at a high voltage a photoconductor surface of a photoconductor drum 901 which serves a to-be-scanned surface. A development roller 903 which visualizes with toner the charged electrostatic latent image written by an optical scanning device 900. A cleaning case 905 which scratches the toner left on the photoconductor drum and stores it is arranged. As described above, onto the photoconductor drum, the latent image is written by a plurality of scan lines simultaneously performed for every surface of a polygon mirror. A recording paper is supplied by a feeding roller 907 from a feeding tray 906, the timing of recording thereon along the sub-scanning direction is adjusted by a pair of register rollers 908. Then, at a time it passes the photoconductor drum, the toner image is transferred therefrom by a transfer charger 906, and the transferred image is fixed onto the paper by a fixing roller 909, and is ejected into a delivery tray 910 by a delivery roller 912.

Thus, according to the present invention described above, no complex configuration is needed for generating a pulse pattern, and, thus, a pulse modulation signal generation circuit which generates a pulse modulation signal of the desired pattern can be achieved in a simple configuration. Moreover, by using this pulse modulation signal generation circuit, an optical scanning device, an image formation device, etc., in which a flexibility of a generable pulse modulation signal is improved, and even when a speed of operation is high, a semiconductor laser modulation device which can realize a fine gray scale on an output image, can be provided.

Further embodiments of the present invention will now be described.

Embodiments which will be described relate to laser beam exposure method or laser beam exposure energy distribution producing method of controlling a laser beam exposure energy distribution at a time of exposing a photoconductor by a semiconductor laser with laser beam therefrom especially used as a light source in image formation devices, such as a laser printer, a digital copier, and so forth.

For example, Japanese laid-open patent applications Nos. 05-075199, 05-235446, 09-321376, etc. disclose methods of performing modulation drive of a semiconductor laser. According thereto, a light-receiving current of a light-receiving (photoelectric) device which acts as a monitor of an optical output of a semiconductor laser is compared with a light-emission instruction current, and, thereby, the semiconductor laser is controls rapidly, in a photoelectric negative feedback loop. Then, an electric current in proportion to the light-emitting instruction current is added to an output current of the photoelectric negative feedback loop.

By doing in this way, it becomes possible to appropriately deal with or compensate temperature characteristic, droop characteristic, etc. of a semiconductor laser, and to realize high-speed laser beam modulation.

Due to characteristics of a light-receiving device which acts as a monitor of an optical output of a semiconductor laser, when the optical output of the semiconductor laser is small, the linearity of the light-receiving current output characteristic with respect to the optical input of the light-receiving device may be degraded remarkably. For this reason, the control accuracy in case of a low optical output may become insufficient, and, thus, the optical output may become larger than a predetermined value. In such a case, an adverse influence may occur, such that, for example, a white part of an image may become dirty in a laser printer etc. Furthermore, as the optical output is controlled continuously, the optical output cannot be switched off completely in order to carry out normal operation of the control system, and thus, an offset light should be generated inevitably.

Moreover, in case a circuit which sets up a drive current for adding the drive current to the semiconductor laser is needed, thereby, a circuit space useable for improving the function of an optical modulation IC for a laser printer, or the like is limited.

Furthermore, since the light-receiving device which detects only the optical output of one semiconductor laser is needed, when one light-receiving device detects the output of a plurality of lasers as in a semiconductor laser array, a means for separating the detection output is required.

Figure 42:
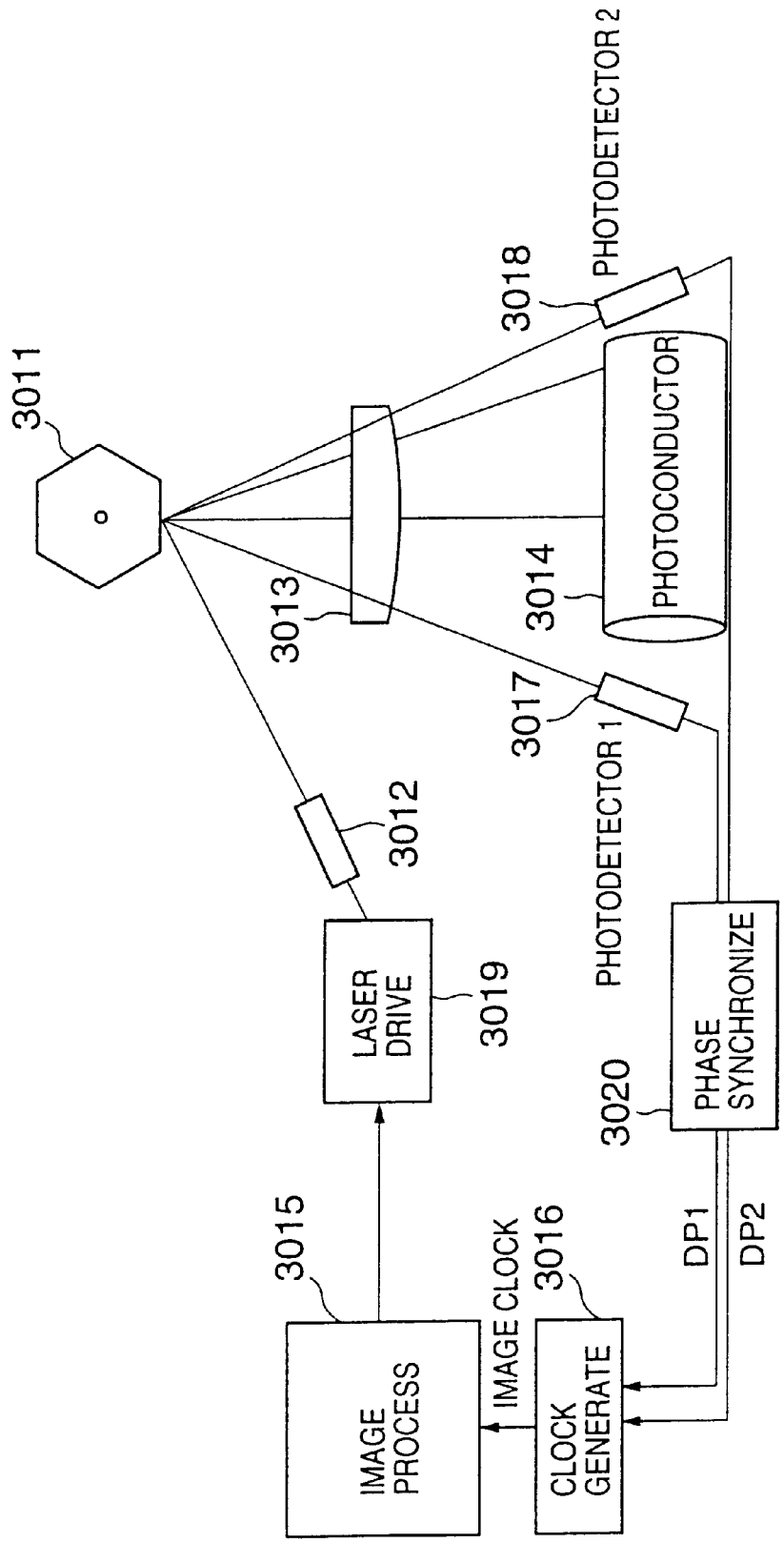
FIG. 42 shows a typical example of configuration of a laser beam exposure device used in an image formation device of an electro-photographic type.

An example of typical configuration of an exposure device in an image formation device is shown in FIG. 42.

In this figure, when a polygon mirror 3011 rotates, scanning with a laser beam output from a semiconductor laser unit 3012 is carried out by a polygon mirror 3011, and this laser beam exposes a photoconductor 3014 through a scanning lens 3013, and forms an electrostatic latent image there. Moreover, the above-mentioned semiconductor laser unit 3012 controls the above-mentioned electrostatic latent image formed on the above-mentioned photoconductor 3014 by controlling the light-emission time interval of the semiconductor laser according to image data generated by an image-processing unit 3015 and an image clock signal on which phase is set up by a phase synchronous circuit 3020.

Moreover, a phase synchronous circuit 3020 sets as the phase of the clock signal generated by a clock generating circuit 3016 as being in synchronization with detection output of photo-detectors 3017 and 3018 which detect the laser beam from the above-mentioned semiconductor laser deflected by the polygon mirror 3011.

Thus, the laser drive circuit 3019, phase synchronous circuit 3020, and clock generation circuit 3016 are indispensable there in terms of position accuracy and interval accuracy of the electrostatic latent image formed on the above-mentioned photoconductor 3014 in the image formation device which uses the laser scanning optical system. Thereby, many signals having the same frequency as that of the image clock signal are needed to be used there, and, thus EMI problem may occur. Furthermore, as a result of the number of parts/components being increased thereby, the cost increases. Furthermore, as the printing speed rises according to a user's demand, it becomes very difficult to operate image data transfer clock signals in the completely same timing throughout the system. Thus, it becomes needed to perform image data transfer in parallel by using a clock signal of a relatively slow rate.

Moreover, as described above, the multi-beam scanning method for attaining high speed and high-density image formation in a laser printer by performing laser writing employing a plurality of laser beams emitted by respective light-sources is proposed. In such a case, it is desirable to use a plurality of semiconductor lasers or an LD array as these light sources.

However, in the related art, as the light-receiving device is shared by all the semiconductor lasers of an LD array, the above-described method disclosed by Japanese laid-open patent application No. 05-075199, 05-235446, or 09-321376 cannot be applied. As a result, cost increase occurs in the case of employing the LD array.

Furthermore, in order to remove influence of the temperature characteristics/droop characteristics of the semiconductor lasers, as in case of applying the method of Japanese laid-open patent application No. 05-075199, 05-235446, or 09-321376, etc., a control should be performed constantly. In such a case, an offset light should be generated as mentioned above.

Moreover, for this purpose, a current setting circuit or the like is needed and thus, the circuit size becomes larger. Furthermore, when a semiconductor laser array is used, means for performing separate detection on each optical output is required additionally as mentioned above.

Furthermore, a beam profile of the semiconductor laser is usually approximated as a Gaussian distribution, and, according thereto, an electrostatic latent image in electronic photograph system is formed. For this reason, in increase of resolution, portions having not binary distribution but having analog distribution occur in the latent image accordingly. Consequently, image density is likely to be influenced by external factors, such as change in image development bias, and may cause problematic image density change.

Figure 45:
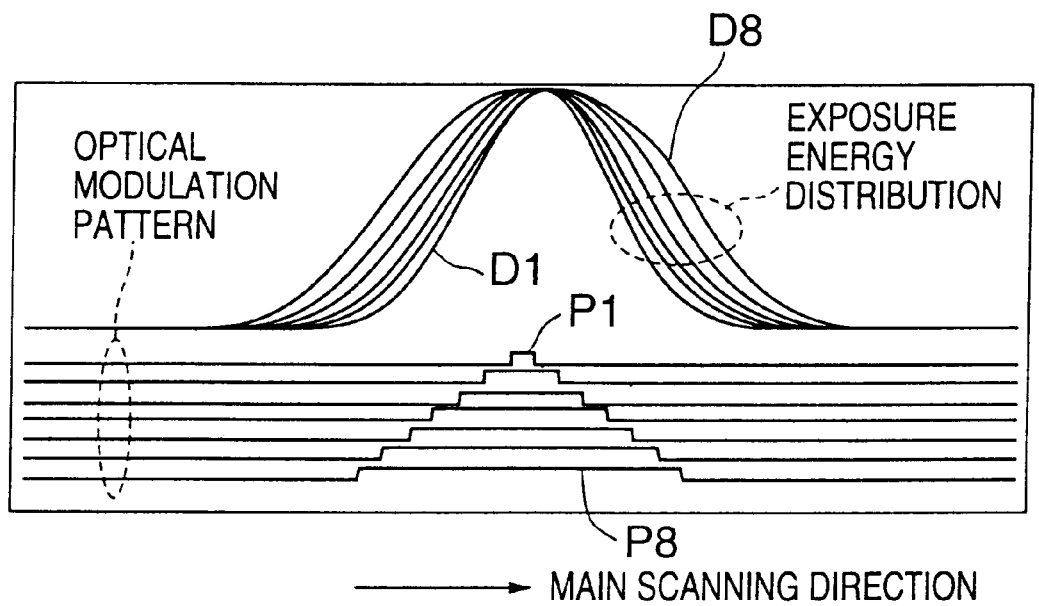
FIG. 45 illustrates laser beam exposure energy distributions on optical modulation patterns in the related art.

Moreover, there is a necessity of preparing many numbers of modulation steps in pulse width of the laser beam for 1 pixel in order to achieve many levels of image density (gray scale; see FIG. 45). Therefore, pulse width must be created by an analog manner, and when changing image density at high speed dynamically in a digital manner or changing an image clock frequency for every pixel, it becomes difficult to change image density precisely according thereto.

Figure 46:
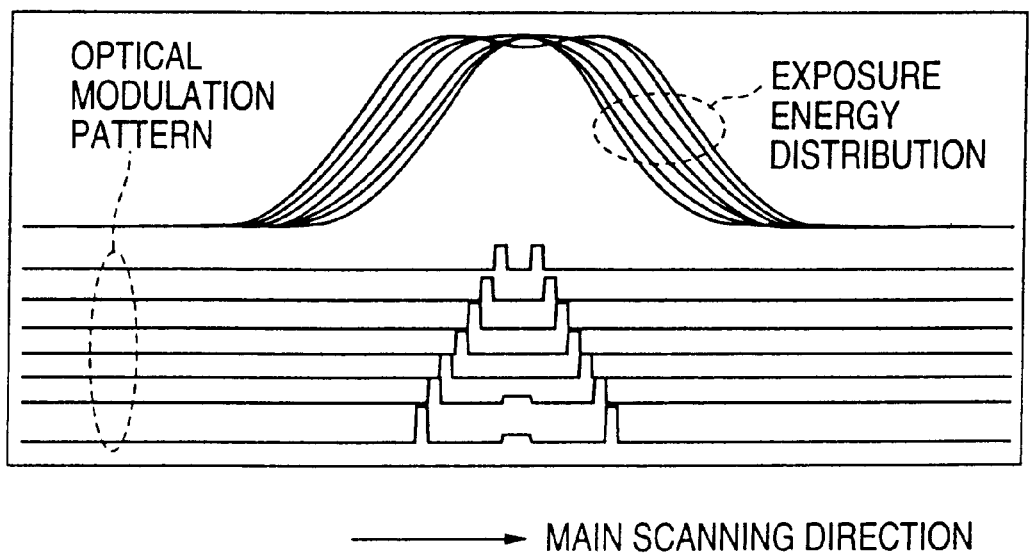
FIG. 46 illustrates laser beam exposure energy distributions on optical modulation patterns according to the present invention with reference to FIGS. 43 and 44.

In comparison to a case where laser beam is simply modulated for every pixel as shown in FIG. 45 (the pulse width is made elongated as image density data increases in value), it is possible to achieve sharp change in exposure energy distribution as shown in FIG. 46 in case where laser beam modulation is made with a short-span optical pulse series. This scheme shown in FIG. 46 is very useful for achieving high quality image formation in an electrophotographic printer or the like. Further, as a result of changing not only pulse width but also pulse pattern as shown in FIG. 46, it is possible to generate an exposure energy distribution suitable for a high-quality image formation device.

In FIG. 45, the scale of the vertical axis of an exposure energy distribution is intentionally altered for each optical modulation pattern in order to make the central peak values in agreement at the same level in the exposure energy. Therefore, the exposure energy distribution having the narrowest width D1 corresponds to the top optical modulation pulse pattern P1 (shortest pulse), and the peak value of the distribution D1 is actually lowest. Then, the peak of the exposure energy distribution actually becomes higher as the pulse width on the corresponding modulation pulse pattern is increased. Thus, on the bottom optical modulation pulse pattern (longest pulse) P8, the corresponding exposure distribution D8 actually has the highest peak value.

According to the exposure energy distribution as shown in FIG. 45, in particular when the pulse width of the optical modulation pulse pattern is short, as inclination of the energy distribution at a rising or decaying part is not sharp, influence of external factors such as change in development bias potential and so forth is likely to be remarkable there. Further, even when the pulse width of optical modulation pulse is changed linearly, the width of the actual exposure energy distribution may not change precisely accordingly. Thus, controllability becomes not sufficient.

On the other hand, in the example of FIG. 46 according to the present invention, by changing suitably not only the pulse width of optical modulation pattern but a pulse pattern thereof, the inclination of the exposure energy distribution at rising or decaying part is sharp for each optical modulation pattern, and, also, the width thereof changes linearly. Therefore, controllability is increased, and, also, the influence of the external factors may be effectively reduced. As shown in FIG. 46, by enlarging the intensity of the optical modulation pulse pattern comparatively, and shortening the pulse width into an equal width, it is possible to make the rising or decaying part on the exposure energy distribution sharper in an equal manner, and, as a result, it is possible to make change in the width on the exposure energy distribution linearly as shown in the figure.

The reason why the exposure energy distribution as shown in the top half of FIG. 46 can be obtained by the optical modulation pulse signal as shown in the bottom half of FIG. 46 will now be described.

That is, as compared with the case of FIG. 45, since the level (modulation level) of each pulse of optical modulation pattern (modulation signal) is high in the case of FIG. 46, exposure energy changes rapidly accordingly. Consequently, a rising or decaying part of the exposure energy distribution becomes sharper. Further, as the modulation level on each pulse is high in the case of FIG. 46, as the pulse width were elongated, the exposure energy continuously would have increased accordingly. However, on the character of the photoconductor and on the characteristic of image development process made subsequently, it is not necessary or no substantial effect to increase the exposure energy level over a predetermined level. Accordingly, also in terms of energy saving, the pulse width is shortened as shown in FIG. 46. In this connection, although a recess occurs between pulses as shown in FIG. 46 on each modulation pulse pattern, as a predetermined area of exposure distribution occurs by one pulse, and, also, the slopes thereof overlap one another between adjacent ones, the gap between the adjacent pulses is filled thereby. As a result, the exposure energy distributions having respective predetermined widths are obtained, as shown in the top part of FIG. 46.

Figure 43:
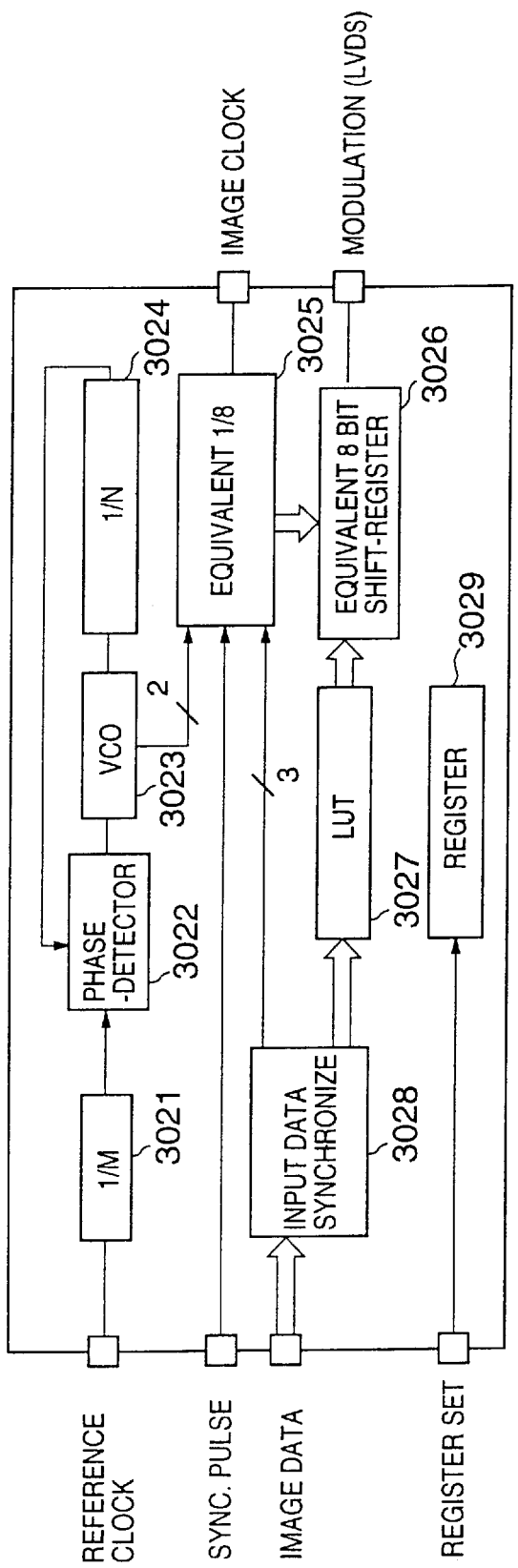
FIG. 43 shows a block diagram of an image clock signal and optical modulation signal output unit according to the present invention.

A block diagram of an optical modulation signal generation circuit according to the present invention as described above with reference to FIGS. 45 and 46 is shown in FIG. 43.

In the circuit of FIG. 43, M-time frequency dividing of a reference clock signal is performed by a frequency dividing part 3021, the output thereof is then input into a phase detector 3022, while N-time frequency dividing of an output of a VCO 3023 is performed by a frequency dividing part 3024, and the output thereof is also input to the phase detector 3022.

The oscillation frequency of the VCO 3023 is controlled by the output of the phase detector 3022, and thus, a PLL is configured. Thereby, a frequency 4 times the frequency of the image clock signal is generated. The VCO 3023 is formed by a four-stage ring oscillators, provides clock signals (signals different in phase by 45° each) into an equivalent-1/8 circuit 3025.

This equivalent-1/8 circuit 3025 generates the pixel clock signal in synchronization with a given synchronization pulse in the accuracy of 1/8 pixel clock period. Further, to the equivalent-1/8 circuit 3025, a signal (image clock phase sifting data) for delaying or advancing the phase of the image clock signal by 1/16, 1/16, 0, −1/16, and −2/16 periods are input together with the image data, and, also, this 1/8 circuit 3025 generates clock signals having predetermined phase differences from the image clock signal, and provides them to an equievalent-8-bit shift register 3026.

The euievalent-8-bit shift register 3026 is configured such that, as if it divides one pixel by 8 and it operates on the clock signal eight times the image clock signal, as a result of utilizing the fact that the VCO 3023 provides the frequency four times that of the pixel clock signal and also utilizing the normal clock signal and inverted clock signal thereof. The 8-bit shift register 3026 converts the image data into the optical modulation pattern in which one pixel is divided by 8 through a LUT 3027. Thus, the 8-bit shift register 3026 generates the modulation signal for modulating the semiconductor laser based on the image data, and image clock phase shifting data. There, according to the image data, the modulation signal having modulation patterns shown in FIG. 47 is output.

Figure 47:
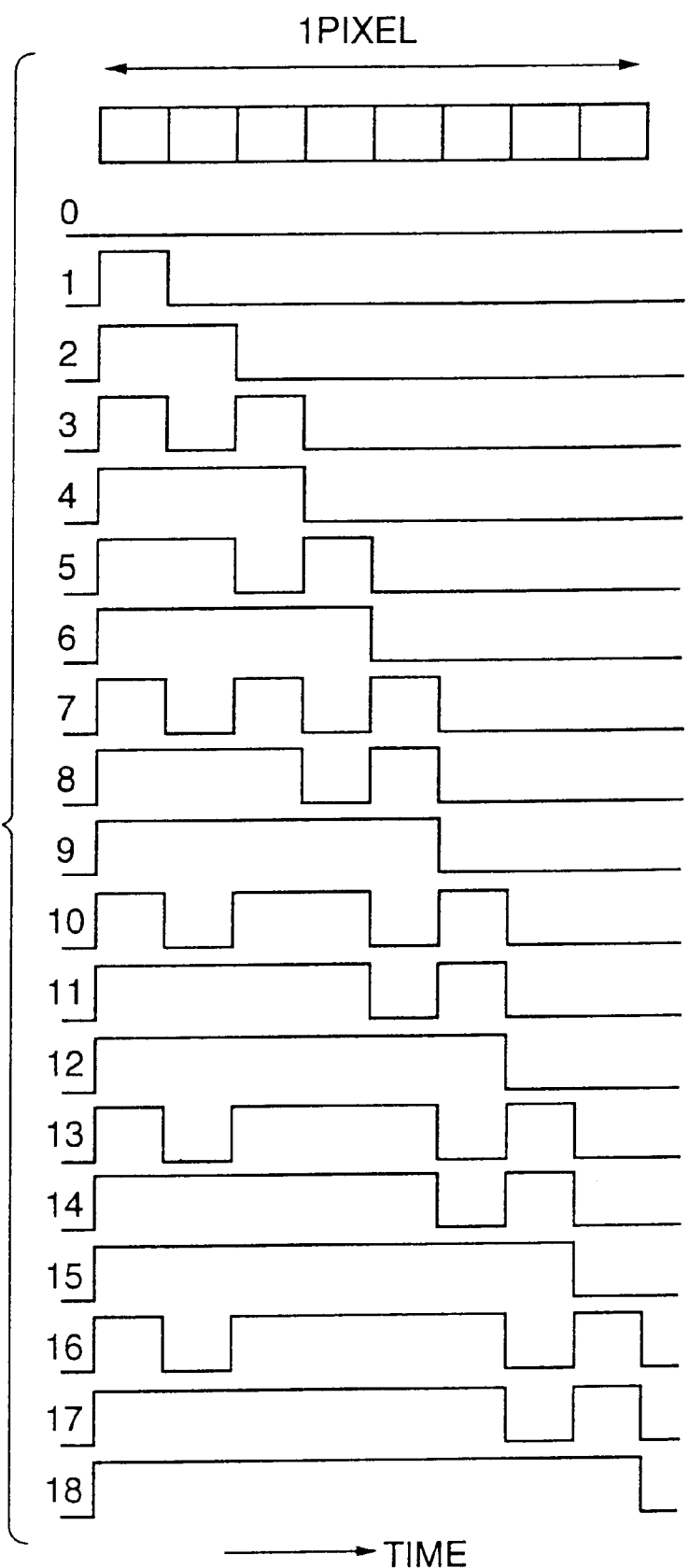
FIG. 47 illustrates an example of optical modulation patterns according to the present invention with reference to FIGS. 43 and 44.

In the example of FIG. 47, 1 pixel is divided into eight parts as mentioned above. Although the modulation patterns '2' and '3' are same as one another on the total exposure energy, the image density is higher on the pattern '3' (larger in dot diameter) in terms of beam profile of the semiconductor laser and the fact that scanning is made, as shown in FIGS. 45 and 46. By employing these pulse sequences for modulating the semiconductor laser, it is possible to express number of different densities (gray scale) more than a possible number of total pulse widths-(total exposure energies of semiconductor laser).

Figure 48:
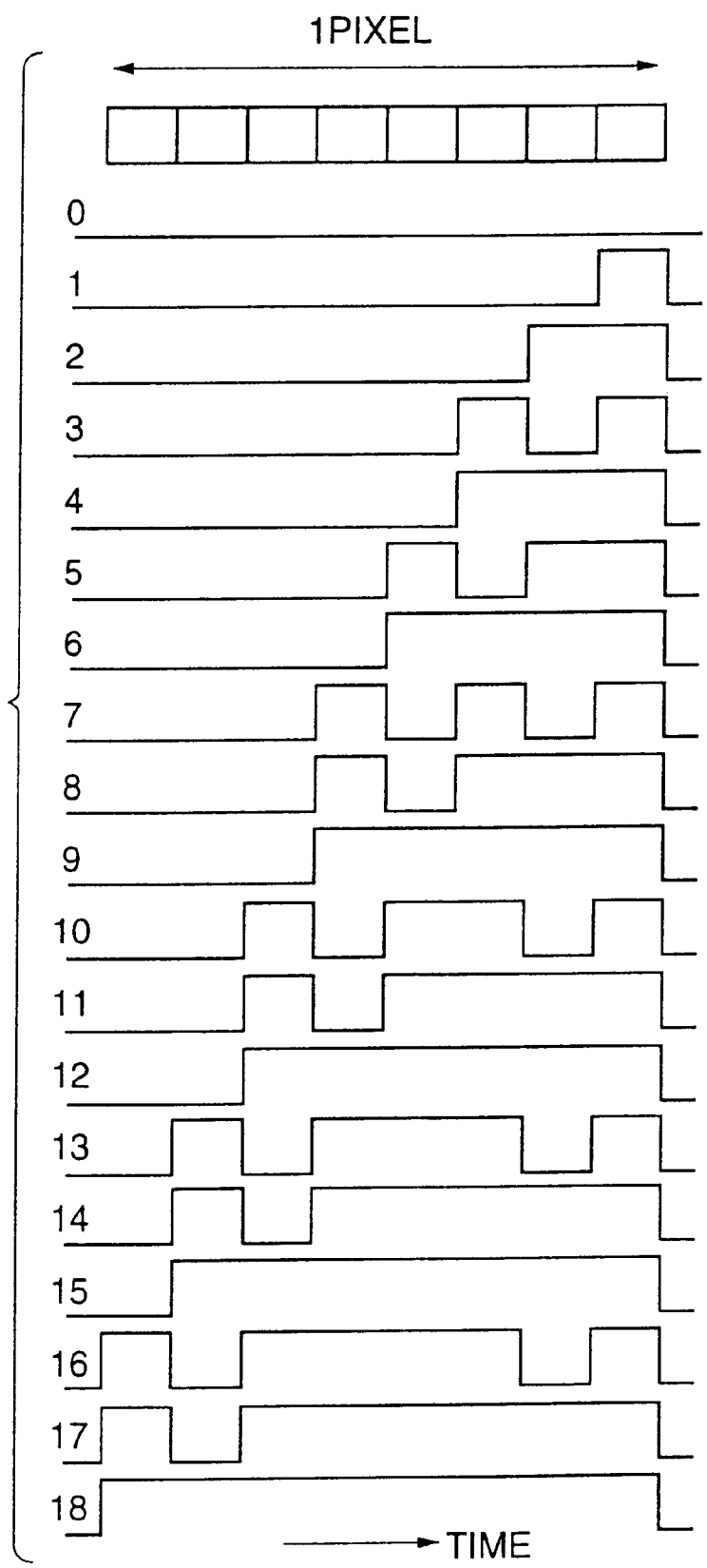
FIG. 48 illustrates another example of optical modulation patterns according to the present invention with reference to FIGS. 43 and 44.

FIG. 48 shows another example in case of making density high from the right end of a pixel, while it is made from the left end in the example shown in FIG. 47.

Figure 44:
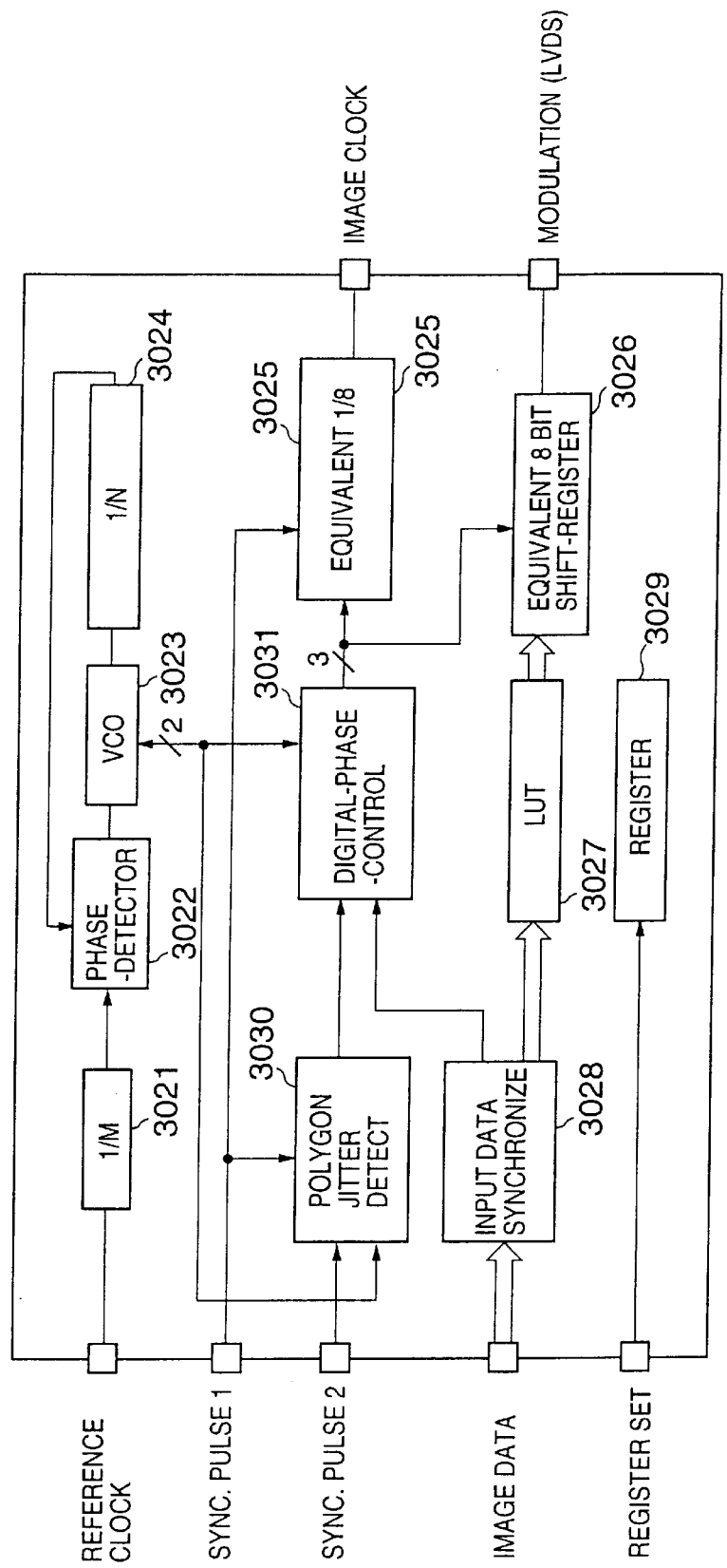
FIG. 44 shows a block diagram of another example of the image clock signal and optical modulation signal output unit according to the present invention.

FIG. 44 shows another example of the optical modulation signal generation circuit according to the present invention with reference to FIGS. 46. In this example, in order to detect a change in scanning speed occurring due to rotation speed variation on the polygon mirror, and magnification variation through the optical system, the time interval of the above-mentioned synchronization pulse 1 (detection signal of the photo-detector 1) and synchronization pulse 2 (detection signal of the photo-detector 2) are detected in the 1/8-pixel accuracy according to the output clock signal of the VCO 3023. Then, a control is made such that the phase of the image clock signal is changed in a digital manner so that an error obtained from comparison of the above-mentioned detection result with a reference may made 0.

This control result as well as the phase control data together with the image data are input to a digital phase control circuit 3031, and thereby, the amount of phase shift on the image clock signal is determined.

A polygon-jitter detection circuit 3030 has a number of control parts corresponding the number of polygon surfaces of the polygon mirror each performing a control such as to cause an error between the detection result and predetermined value to be 0 in a digital manner. There, the synchronization pulse 1 is counted every polygon surface, i.e., 0, 1, 2, . . . , (the number of polygon surfaces)−1, 0, 1, 2, . . . , then, according to the count result, the control result is switched, and, thus, the thus-selected control result is output to the digital phase control circuit 3031. Thereby, pitch variation on each polygon surface can be corrected, and, also, pixel position variation occurring due to jitter in rotation of polygon mirror and so forth can be corrected.

It is also possible that only one synchronization pulse instead of the above-mentioned synchronization pulses 1 and 2 is used, and, also, switching for every polygon surface is not made. Thereby, it is possible to reduce the influence of jitter on rotation of polygon mirror in case only one synchronization pulse is available.

Further, as to the control speed, as the error detection is sampled once per each rotation of polygon mirror, setting is made such that the gain becomes 1 on a cycle of not less than three rotations so that stable control characteristics are achieved. This is because, as phase delay occurs by 360° on sampling frequency and, then, phase delay by 180° would make the negative feedback loop unstable. Accordingly, it is necessary to make setting such that the gain becomes 1 through more than 3 times of control.

Thus, according to the embodiment of the present invention shown in FIG. 43, modulation drive of the semiconductor laser is made based on the optical modulation signal, scanning of the photoconductor is made by laser beam from the semiconductor laser, a device detecting the scanning beam from the scanning unit at a predetermined position with respect to to the photoconductor are provided. In the image formation device scans the above-mentioned photoconductor at a predetermined timing based on the thus-detected signal from the scanning light detection device, and forms an electrostatic latent image according to the optical modulations signal. There, the image density (gray scale) on 1 pixel is controlled by changing a pulse pattern together with changing a pulse width on the optical modulation pattern for 1 pixel as described above with reference to FIG. 46.

According to the embodiment described with reference to FIG. 44, the semiconductor laser is modulated based on an optical modulation signal, the scanning unit scans the photoconductor with laser beam from the semiconductor laser, and the device detecting the scanning beam from the above-mentioned scanning unit at a predetermined position with respect to the photoconductor. The image formation device scans the above-mentioned photoconductor at a predetermined timing based on the detected signal from the scanning beam image on the photoconductor according to the above-mentioned optical modulations signal.

There, the time detecting unit is provided in the embodiment shown in FIG. 44 and detects output timing of the first scanning position detecting device and second scanning position detecting device, by using a clock signal of N times the pixel clock signal. The thus detected time is compared with a predetermined value, the comparison result is stored by a storage unit, and, by using the output of the storage device, the phase of the image clock pulse is shifted appropriately. Thereby, each dot position can be controlled at high accuracy, and, thus, an image formation device creating quality images can be achieved.

Further, a number of the above-mentioned storage units corresponding the number of polygon surfaces of the polygon mirror may be provided, the counting unit may repeat counting operation on the output of the first scanning position detecting device every number of the polygon surfaces, and, based on the counting output of the counting unit, the output of the storage unit to be used may be switched. Thereby, with a simple configuration, scanning speed can be corrected for each polygon surface.

Figure 49:
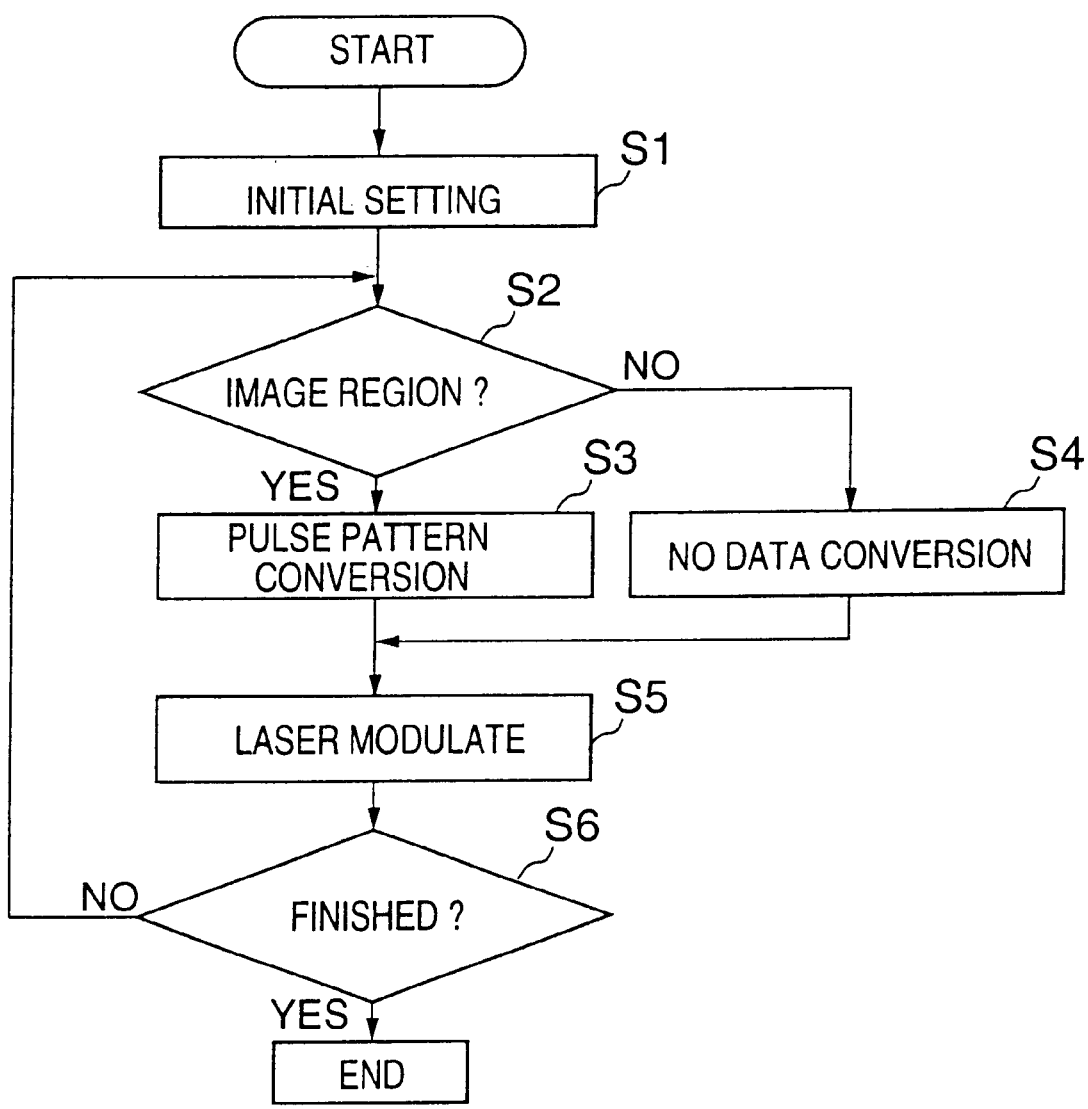
FIG. 49 shows a flow chart illustrating a laser beam exposure method according to the present invention with reference to FIGS. 43 and 44.

FIG. 49 is a flow chart illustrating optical modulation operation in each of the above-described embodiments shown in FIGS. 43 and 44. At Step S1, a predetermined initial setup is performed and, next, it is determined whether target image data is of an image region (not a text region) by Step S2. Then, when it is of an image region, the image data is converted into a pulse pattern sequence as shown in FIG. 47 or 48, according to the density value (pixel value) at Step S3. This conversion may be made simply by using a predetermined conversion table. It is also possible to employ another method of converting image density data into a pattern in a manner such that other pulse pattern sequences are employed such that image density become higher in sequence other than those shown in FIGS. 47 and 48.

At Step S5, modulation drive of the semiconductor laser is carried out according to the optical modulation pattern obtained at Step S3. At Step S6, the processing is retuned to Step S2 for processing of the subsequent image data, and subsequent operation is repeated.

Such operation can be achieved by using a general-purpose computer (connected with an image formation device for exchange of signals therewith), such as a personal computer, by storing a software program for causing the computer to perform the above-mentioned operations into a storage medium, such as CD-ROM.

Figure 50:
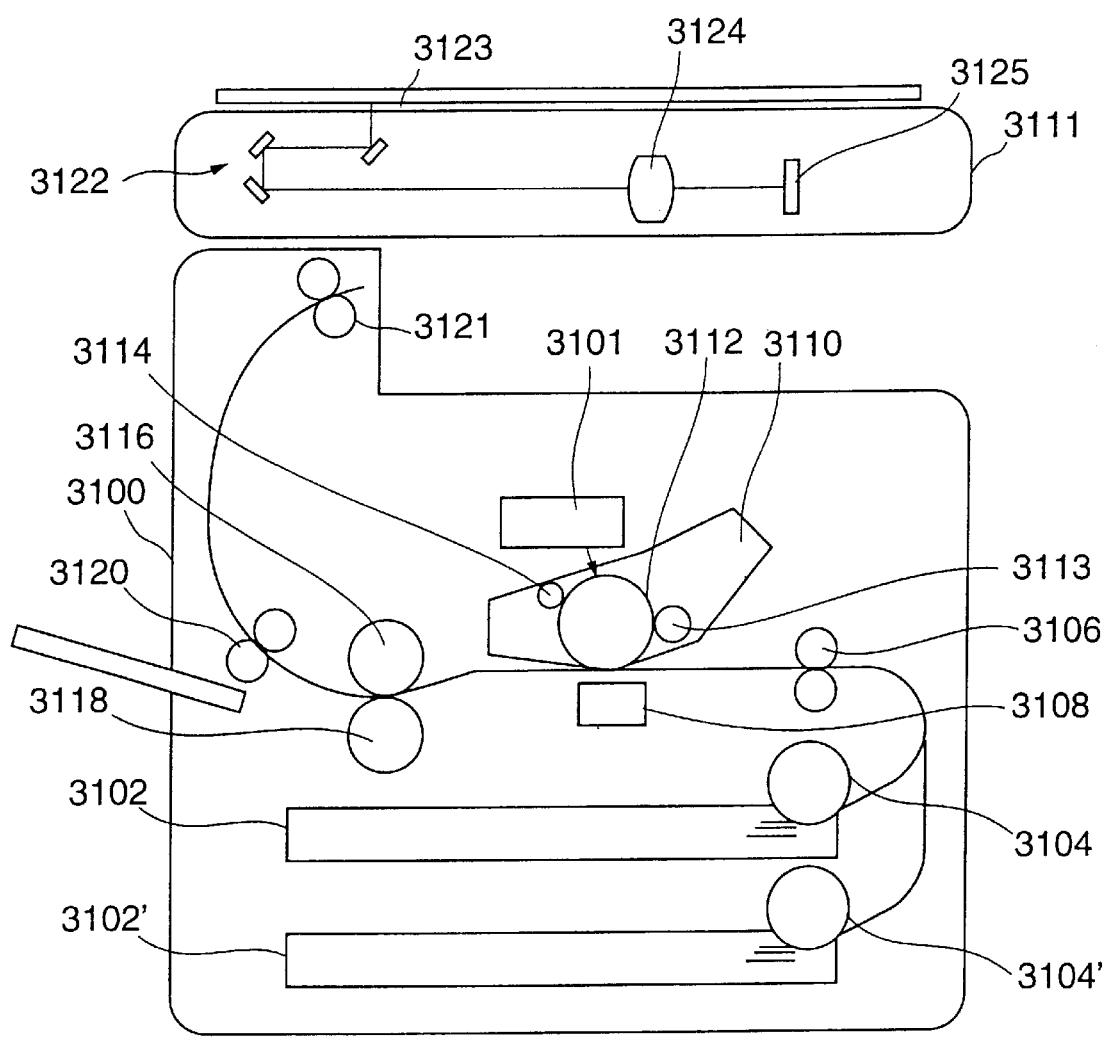
FIG. 50 shows a side sectional view roughly illustrating an internal configuration of a digital copying machine according to the present invention with reference to FIGS. 43 and 44.
Figure 51:
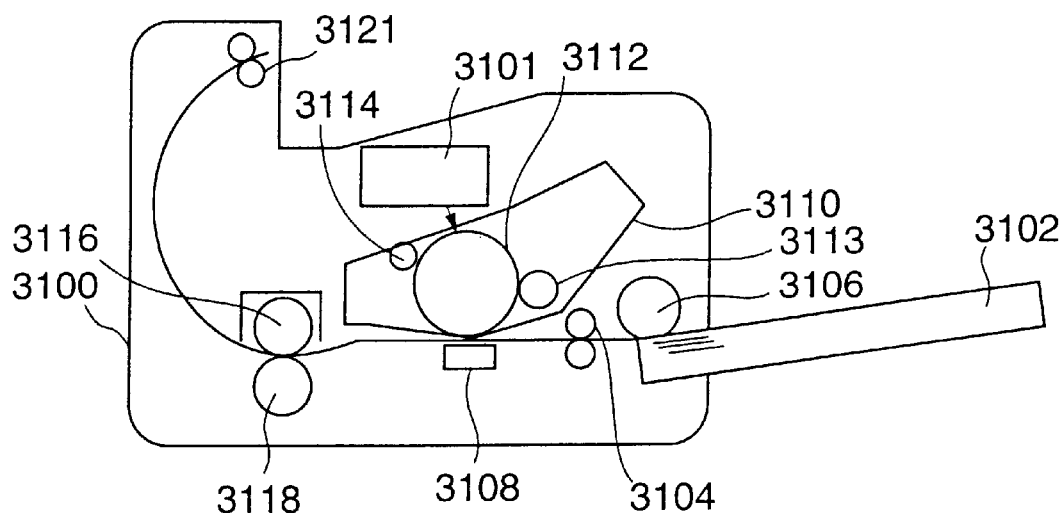
FIG. 51 shows a side sectional view roughly illustrating an internal configuration of a laser printer according to the present invention with reference to FIGS. 43 and 44.
Figure 52:
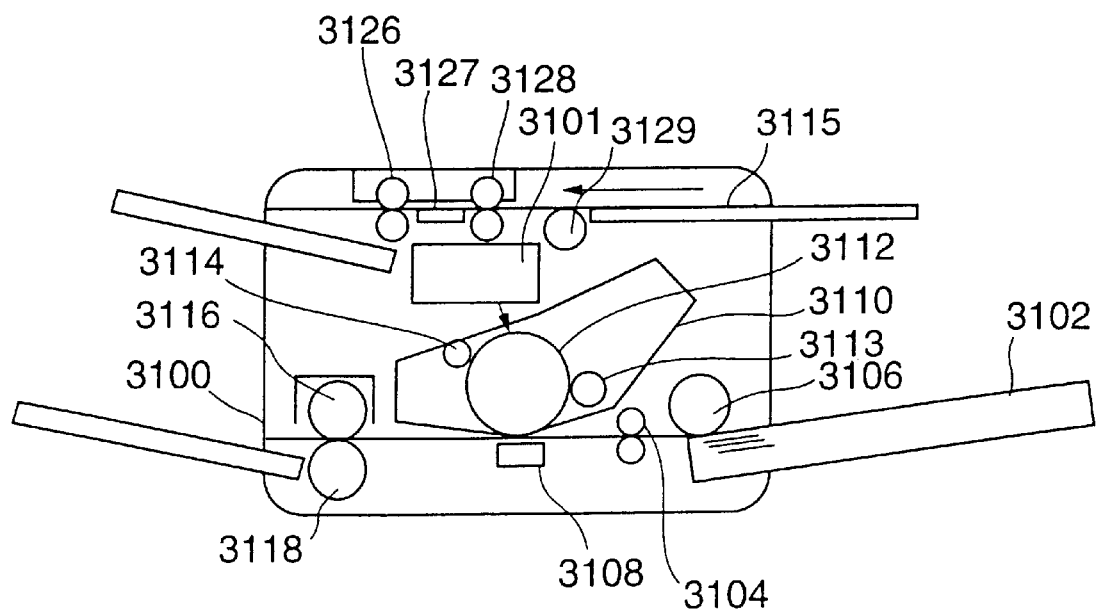
FIG. 52 shows a side sectional view roughly illustrating an internal configuration of an ordinary paper facsimile machine according to the present invention with reference to FIGS. 43 and 44.

FIGS. 50, 51 and 52 illustrate internal configuration diagrams of a digital copier, a laser printer, and an ordinary-paper facsimile machine, which are image formation devices of electro-photographic type each employing the optical modulation signal generation circuit described above with reference to FIGS. 43 or 44 according to the present invention.

As shown in these figures, each machine includes an image formation device body 3100, a cassette 3102 holding papers, a feeding roller 3104 taking paper one by one from the cassette, a registration roller 3106 controlling paper conveying timing, a transfer charger 3108, and a process cartridge 3110 including a photoconductor drum 3112, a development roller 3113, a charging roller 3114, and so forth. Further. the machine also includes a fixing roller 3116 having a halogen lamp built therein, a pressing roller 3118 which form a fixing unit, a conveying roller 3120 and a paper ejecting roller 3121.

An optical scanning device 3101 shown in the figures includes the optical modulation signal generation circuit described above with reference to FIGS. 43 or 44 according to the present invention, and, by this circuit, the optical modulation signal is generated according to given image data. Then, based on this optical modulation signal, modulation drive of the semiconductor laser is carried out, and laser beam modulated is emitted thereby. The photoconductor drum 3112 charged uniformly by the charging 3114 is exposed by this laser beam, an electrostatic latent image is thereby formed thereon, is visualized by toner supplied by the development roller 3113.

The paper taken out by the feeding roller 104 is conveyed according to the timing of image writing start of the optical scanning device by the registration roller 3106, and the toner image is transferred onto the paper from the photoconductor The transferred toner image is fixed onto the paper by the fixing roller 3116, and then, the paper is ejected out from the machine.

In FIG. 50, in an image reading device 3111 an image from an image reading section is imaged through an imaging lens 3124 and is pick up by a photoelectric device such as a CCD or the like. Then, as a mirror group 3112 is moved appropriately and, the thus-pick-up image is converted into electronic data in sequence.

In FIG. 52, in an image reading device 3127, a feeding roller 3129 feeds an original image from an original table 3115, and, an image on the original is converted into electric data in sequence while the original is conveyed by conveying roller pairs 3126, 3128.

The present invention concerning the embodiments described with reference to FIGS. 43 and 44 is not limited to the above-mentioned embodiments, and, as long as an optical profile (such as a Gaussian distribution) applied directly affects a performance of a system, the present invention may be applied to any other system/machines, such as an optical scanning-type projector, a liquid crystal display device, etc. Similarly, application of the present invention to a CD-R/RW drive, a DVD drive, etc. is also possible.

Moreover, the present invention can also be embodied by supplying a circuit shown in FIGS. 43 or 44 according to the present invention in a form of a cell library or HDL as an IP forming a part of an LSI circuit, and, this may be applied to a process of manufacturing the LSI circuit.

Moreover, although the width 8 times the length of the minimum pulse corresponds to 1 pixel according to the scheme shown in FIGS. 47 or 48, application of the present invention is not limited thereto, and it is also possible to treat the length of the minimum pulse width as 1 pixel instead.

Thus, the density (gray scale) on 1 pixel is obtained by utilizing a combination of pulse pattern control and pulse width control into an optical modulation pulse pattern for an image density. There, image density and image clock signal are controlled in a digital manner. Thus, it is possible to express a large number of different image densities (gray scale) while a number of different pulse widths required therefor is reduced, and, to provide an image formation device creating quality images.

Thus, according to the present invention, it becomes possible to provide an image formation device which can generate a modulation signal and an image clock signal which perform modulation control for a semiconductor laser at high speed with a low cost and small size image formation device which forms an image by scanning a rotation photoconductor by the modulated beam of the semiconductor laser based on the image signal.

Further, the present invention is not limited to the above-described embodiments, and variations and modifications may be made without departing from the scope of the present invention.

The present application is based on Japanese priority applications. Nos. 2001-072874 and 2001-304020, filed on Mar. 14, 2001 and Sep. 28, 2001, respectively, the entire contents of which are hereby incorporated by reference.

What is claimed is:

1. A pulse modulation signal generating circuit comprising:
 a clock generating part generating a high-frequency clock signal having a frequency higher than that of a pixel clock frequency; and
 a serial modulation signal generating part generating a serial modulation signal having a serial pulse sequence based on the high-frequency clock signal, wherein light emission is modulated according to the serial modulation signal, and, thus, each pixel of an image is formed according to the pixel clock frequency.

2. The pulse modulation signal generating circuit as claimed in claim 1, further comprising a modulation data generating part generating modulation data comprising a predetermined bit pattern according to given image data, said serial modulation signal generating part generating the serial modulation signal based on the modulation data.

3. The pulse modulation signal generating circuit as claimed in claim 2, wherein said modulation data generating part changes a number of bits of the modulation data.

4. The pulse modulation signal generating circuit as claimed in claim 3, wherein said modulation data generating part makes a pulse occurrence rate on the modulation data uniform while changing the number of bits.

5. The pulse modulation signal generating circuit as claimed in claim 3, wherein said modulation data generating part makes a pulse occurrence pattern on the modulation data unchanged while changing the number of bits.

6. The pulse modulation signal generating circuit as claimed in claim 2, wherein said modulation data generating part comprises a look-up table for converting given image data into corresponding modulation data.

7. The pulse modulation signal generating circuit as claimed in claim 6, wherein said look-up table comprises a plurality of look-up tables, and switching is made from among outputs of said plurality of look-up tables to determine one to be used according to the given image data.

8. The pulse modulation signal generating circuit as claimed in claim 7, wherein said plurality of look-up tables have different bit lengths.

9. The pulse modulation signal generating circuit as claimed in claim 7, wherein said plurality of look-up tables comprise two sets thereof, a first one comprising a plurality of look-up tables having different bit lengths, and a second one comprising a plurality of look-up tables corresponding to the configurations of said first one.

10. The pulse modulation signal generating circuit as claimed in claim 2, wherein said modulation data generating part comprises a decoder decoding given image data into corresponding modulation data.

11. The pulse modulation signal generating circuit as claimed in claim 2, wherein said modulation data generating part comprises a look-up table for converting given image data into corresponding modulation data, a decoder decoding given image data into corresponding modulation data, and a selector selecting the output of one of said look-up table and decoder.

12. The pulse modulation signal generating circuit as claimed in claim 1, wherein said serial modulation signal generating part loads the modulation signal according to a given load signal and converts it into a serial pulse sequence according to the high-frequency clock signal.

13. The pulse modulation signal generating circuit as claimed in claim 12, wherein said serial modulation signal generating part comprises a shift register.

14. The pulse modulation signal generating circuit as claimed in claim 12, wherein said serial modulation signal generating part comprises a plurality of shift registers, and a selector selecting one of the outputs of said plurality of shift registers.

15. The pulse modulation signal generating circuit as claimed in claim 14, wherein said plurality of shift registers operate according to a single clock signal having a frequency 1/M that of the high-frequency clock signal, where M denotes a natural number more than 1.

16. The pulse modulation signal generating circuit as claimed in claim 15, wherein said serial modulation signal generating part further comprises a phase adjuster adjusting phases of output pulses of said plurality of shift registers.

17. The pulse modulation signal generating circuit as claimed in claim 14, wherein said plurality of shift registers operate according to a plurality of phase clock signals having a frequency 1/M that of the high-frequency clock signal, where M denotes a natural number more than 1.

18. The pulse modulation signal generating circuit as claimed in claim 1, wherein said clock generating part comprises a PLL comprising a differential-type ring oscillator, wherein the high-frequency clock signal comprises a plurality of clock signals having different phases obtained as a result of a plurality of phases are taken by said ring oscillator.

19. The pulse modulation signal generating circuit as claimed in claim 1, wherein said clock generating part comprises a PLL comprising a delay part delaying a reference clock signal so as to provide a plurality of clock signals having different phases, wherein the high-frequency clock signal comprises said plurality of clock signals having different phases obtained from said delay part.

20. The pulse modulation signal generating circuit as claimed in claim 19, wherein said clock generating part further comprises a control part controlling a delay amount on said delay part.

21. The pulse modulation signal generating circuit as claimed in claim 20, wherein said control part comprises a detection part detecting the delay amount on the clock signal obtained from said delay part, and an error amplifier.

22. A semiconductor laser modulation device comprising:
a semiconductor laser;
a laser modulating part modulating a laser beam emitted from said semiconductor laser according to a pulse modulation signal; and
the pulse modulation signal generating circuit claimed in claim 1 generating the pulse modulation signal to be used by said laser modulating part.

23. An optical scanning device comprising:
a semiconductor laser;
a scanning optical system deflecting a laser beam emitted by said semiconductor laser;
a laser modulating part modulating a laser beam emitted from said semiconductor laser according to a pulse modulation signal; and
the pulse modulation signal generating circuit claimed in claim 1 generating the pulse modulation signal to be used by said laser modulating part.

24. An image formation device comprising:
a semiconductor laser;
a scanning optical system deflecting a laser beam emitted by said semiconductor laser;
an image forming part forming an image according to the laser beam deflected by said scanning optical system;
a laser modulating part modulating a laser beam emitted from said semiconductor laser according to a pulse modulation signal; and
the pulse modulation signal generating circuit claimed in claim 1 generating the pulse modulation signal to be used by said laser modulating part.

25. The image formation device as claimed in claim 24, wherein said semiconductor laser is configured such as to emit a plurality of laser beams simultaneously.

26. An exposure method comprising the steps of:
a) driving a light-emitting unit according to modulation signal; and
b) exposing a photoconductor while scanning it with a laser beam emitted by said light-emitting unit, wherein: the modulation signal comprises a pulse sequence; and an exposure energy distribution in which the photoconductor is exposed is determined as a result of control of both a pulse width and a pulse pattern of the pulse sequence.

27. The method as claimed in claim 26, wherein, as a result of control of the exposure energy distribution, a density of a latent image formed on the photoconductor is controlled at each position.

28. The method as claimed in claim 26, wherein as a result of control of the exposure energy distribution, a density of a latent image formed on the photoconductor is controlled on each pixel.

29. The method as claimed in claim 26, wherein the exposure energy distribution is controlled not only by control of total light-emission time interval during each unit time but also by controlled of light-emission timing there.

30. The method as claimed in claim 26, wherein the exposure energy distribution is controlled not only by control of total light-emission time interval for each pixel but also by control of light-emission timing thereof.

31. The method as claimed in claim 26, wherein:
modulation in the modulating signal is made in synchronization with an image clock signal;
a scanning speed on the photoconductor is detected; and
phase of pulses of the image clock signal is controlled according to the thus-detected scanning speed.

32. The method as claimed in claim 31, wherein
a polygon mirror is used for scanning the photoconductor;
the detected scanning speed is stored for each of the number of polygon surfaces of the polygon mirror; and
phase of pulses of the image clock signal is controlled according to the thus-detected scanning speed for each polygon surface.

33. An exposure device comprising:
a part driving a light-emitting unit according to modulation signal; and
a part exposing a photoconductor while scanning it with a laser beam emitted by said light-emitting unit,
wherein:
the modulation signal comprises a pulse sequence; and
an exposure energy distribution in which the photoconductor is exposed is determined as a result of control of both a pulse width and a pulse pattern of the pulse sequence.

34. The exposure device as claimed in claim 33, wherein, as a result of control of the exposure energy distribution, a density of a latent image formed on the photoconductor is controlled at each position.

35. The exposure device as claimed in claim 33, wherein, as a result of control of the exposure energy distribution, a density of a latent image formed on the photoconductor is controlled on each pixel.

36. The exposure device as claimed in claim 33, wherein the exposure energy distribution is controlled not only by control of total light-emission time interval during each unit time but also by control of light-emission timing there.

37. The exposure device as claimed in claim 33, wherein the exposure energy distribution is controlled not only by control of total light-emission time interval for each pixel but also by control of light-emission timing therefor.

38. The exposure device as claimed in claim 33, wherein:
modulation in the modulating signal is made in synchronization with an image clock signal;
a scanning speed on the photoconductor is detected by a detecting part; and
phase of pulses of the image clock signal is controlled according to the thus-detected scanning speed.

39. The exposure device as claimed in claim 38, wherein
a polygon mirror is used for scanning the photoconductor;
the detected scanning speed is stored for each of the number of polygon surfaces of the polygon mirror; and
phase of pulses of the image clock signal is controlled according to the thus-detected scanning speed for each polygon surface.

40. An image formation device, comprising:
a part driving a light-emitting unit according to modulation signal; and
a part exposing a photoconductor while scanning it with a laser beam emitted by said light-emitting unit, so as to form a latent image on the photoconductor,
wherein:
the modulation signal comprises a pulse sequence; and
an exposure energy distribution in which the photoconductor is exposed is determined as a result of control of both a pulse width and a pulse pattern of the pulse sequence.

41. An optical modulation signal generating circuit generating a modulation signal for exposing a photoconductor, comprising:
a part generating a pulse sequence as the modulation signal; and
a part controlling of both a pulse width and a pulse pattern of the pulse sequence so as to control an exposure energy distribution in which the photoconductor is exposed.

42. The optical modulation signal generating circuit as claimed in claim 41, wherein, as a result of control of the exposure energy distribution, a density of a latent image formed on the photoconductor is controlled at each position.

43. The optical modulation signal generating circuit as claimed in claim 41, wherein, as a result of control of the exposure energy distribution, a density of a latent image formed on the photoconductor is controlled on each pixel.

44. The optical modulation signal generating circuit as claimed in claim 41, wherein the exposure energy distribution is controlled not only by control of total light-emission time interval during each unit time but also by control of light-emission timing there.

45. The optical modulation signal generating circuit as claimed in claim 41, wherein the exposure energy distribution is controlled not only by control of total light-emission time interval for each pixel but also by control of light-emission timing therefor.

46. The optical modulation signal generating circuit as claimed in claim 41, wherein:
modulation in the modulating signal is made in synchronization with an image clock signal;
a scanning speed on the photoconductor is detected by a detecting part; and
phase of pulses of the image clock signal is controlled according to the thus-detected scanning speed.

47. The optical modulation signal generating circuit as claimed in claim 46, wherein:
a polygon mirror is used for scanning the photoconductor;
the detected scanning speed is stored for each of the number of polygon surfaces of the polygon mirror; and
phase of pulses of the image clock signal is controlled according to the thus-detected scanning speed for each polygon surface.

* * * * *